United States Patent
Pi et al.

(10) Patent No.: US 8,189,559 B2
(45) Date of Patent: May 29, 2012

(54) RATE MATCHING FOR HYBRID ARQ OPERATIONS

(75) Inventors: Zhouyue Pi, Richardson, TX (US);
Farooq Khan, Allen, TX (US);
Jianzhong Zhang, Irving, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 931 days.

(21) Appl. No.: 12/073,886

(22) Filed: Mar. 11, 2008

(65) Prior Publication Data

US 2009/0028129 A1    Jan. 29, 2009

Related U.S. Application Data

(60) Provisional application No. 60/935,019, filed on Jul. 23, 2007.

(51) Int. Cl.
*H04L 12/28* (2006.01)
(52) U.S. Cl. ......... 370/351; 714/748; 714/752; 714/786
(58) Field of Classification Search .................. 370/310, 370/351; 714/752, 748, 786
See application file for complete search history.

(56) References Cited

U.S. PATENT DOCUMENTS

| | | |
|---|---|---|
| 2002/0009157 A1 | 1/2002 | Sipola |
| 2002/0075867 A1 | 6/2002 | Herrmann |
| 2002/0181603 A1 | 12/2002 | Kim et al. |
| 2003/0067907 A1 | 4/2003 | Rezaiifar et al. |
| 2004/0088634 A1 | 5/2004 | Kim et al. |
| 2004/0221219 A1 | 11/2004 | Von Elbwart et al. |
| 2005/0243793 A1 | 11/2005 | Kim et al. |
| 2008/0301536 A1* | 12/2008 | Shin et al. ..................... 714/786 |
| 2008/0313521 A1* | 12/2008 | Frederiksen et al. ......... 714/748 |
| 2009/0041110 A1* | 2/2009 | Malladi ........................ 375/240 |
| 2009/0049359 A1* | 2/2009 | Malladi et al. ................ 714/752 |
| 2010/0208635 A1* | 8/2010 | Frederiksen et al. ......... 370/310 |

FOREIGN PATENT DOCUMENTS

| | | |
|---|---|---|
| AU | 2008261646 A1 | 12/2008 |
| JP | 2004529571 A | 9/2004 |
| JP | 2005237005 A | 9/2005 |
| KR | 2003-0060387 | 7/2003 |
| KR | 1020040084212 A | 10/2004 |
| KR | 1020050069902 A | 7/2005 |
| KR | 1020060055175 A | 5/2006 |
| RU | 2282310 C2 | 8/2006 |

(Continued)

OTHER PUBLICATIONS

Notification of Transmittal of the International Search Report and the Written Opinion of the International Searching Authority, or the Declaration dated Dec. 11, 2008 in connection with PCT Application No. PCT/KR2008/004304.

(Continued)

*Primary Examiner* — Albert T Chou

(57) ABSTRACT

A method of rate matching process of the hybrid Automatic Repeat reQuestion (HARQ) operation in which coded bits are selected for a transmission depends on whether the transmission is a first transmission of a new packet or a retransmission of an existing packet. In downlink of long term evolution (LTE) system, a downlink grant message is transmitted along with the packet data transmission. The grant message may also contain the redundancy version (RV). A new data indicator (NDI) is introduced to indicate the start of a new packet. The improved method of rate matching may be implanted into either a transmitter or a receiver.

18 Claims, 20 Drawing Sheets

FOREIGN PATENT DOCUMENTS

| | | |
|---|---|---|
| RU | 2300175 C2 | 5/2007 |
| WO | WO 03/069784 A1 | 8/2003 |
| WO | WO 2006/000991 A1 | 1/2006 |
| WO | WO 2008/154646 A2 | 12/2008 |

OTHER PUBLICATIONS

Samsung, Qualcomm, LGE, ITRI, "Circular buffer rate matching for LTE", 3GPP TSG RAN WG1 Meeting #49, May 7-11, 2007, 3 pages.

Office Action dated Jul. 2, 2010 in connection with Australian Patent Application No. 2008279907.

Russian Decision of Grant dated Feb. 7, 2011 in related Russian Application No. 2010102030.

"Implementation considerations for circular buffer rate matching", Samsung, 3GPP TSG RAN WG1 Meeting #49, May 7-11, 2007, 4 pages.

Office Action dated Nov. 15, 2010 in connection with Russian Patent Application No. 2010102030/09.

\* cited by examiner

RATE MATCHING FOR HYBRID ARQ OPERATIONS

CLAIM OF PRIORITY

This application makes reference to, incorporates the same herein, and claims all benefits accruing under 35 U.S.C. §119 from applications earlier filed in the U.S. Patent & Trademark Office on 23 Jul. 2007 and there duly assigned Ser. No. 60/935,019.

BACKGROUND OF THE INVENTION

1. Field of the Invention

The present invention relates to a method of rate matching process to improve the hybrid Automatic Repeat reQuestion (HARQ) operation, and more particularly, to a method of rate matching process of the hybrid Automatic Repeat reQuestion (HARQ) operation in which coded bits are selected for a transmission depending on whether the transmission carries the first transmission of a new packet or a retransmission for an existing packet.

2. Description of the Related Art

Currently, hybrid Automatic Repeat reQuestion (HARQ) is widely used in communication systems to combat decoding failure and improve reliability of data communication. In a data communication system, each data packet is protected by using a certain forward error correction (FEC) coding scheme. Each subpacket may only contain a portion of coded bits of the entire packet. The process of selecting coded bits to be transmitted in a subpacket is called subpacket generation, or rate matching.

In a contemporary HARQ operation, a data packet is coded by using an encoder with a certain kind of Forward Error Correction (FEC) scheme. The data packet is processed by a subpacket generation/rate matching stage and then a set of subpackets are generated. A subpacket, for example, a subpacket k may only contain a portion of the coded bits. If the transmission by a transceiver for subpacket k fails, as indicated by a negative acknowledgement (NAK) message provided by a feedback acknowledgement channel, a retransmission subpacket, subpacket k+1, is provided to retry the transceive of this data packet. If subpacket k+1 is successfully transceived, an acknowledgement (ACK) message is provided by feedback acknowledgement channel. The retransmission subpackets may contain different coded bits from one subpacket. The receiver may softly combine or jointly decode all the received subpackets by a decoder to improve the chance of decoding. Normally, a maximum number of transmissions of a packet is configured in consideration of both reliability, packet delay, and implementation complexity.

N-channel synchronous hybrid Automatic Repeat reQuestion (HARQ) is widely used in wireless communication systems because of the simplicity of the N-channel synchronous hybrid Automatic Repeat reQuestion (HARQ). For example, synchronous hybrid Automatic Repeat reQuestion (HARQ) has been accepted as the hybrid Automatic Repeat reQuestion (HARQ) scheme for long term evolution (LTE) uplink in 3rd Generation Partnership Project (3GPP).

Because of a fixed timing relationship between subsequent transmissions, the transmission slots in an individual hybrid Automatic Repeat reQuestion (HARQ) channel exhibits an interlace structure. When a packet is correctly decoded, the receiver sends back an acknowledgement (ACK) to the transmitter. The transmitter then starts transmitting a new packet at a next slot in the current interlace. Otherwise, the transmitter receives a negative acknowledgement (NAK) from the receiver, and the transmitter transmits another sub-packet of the same packet at the next slot in the current interlace. Different from synchronous hybrid Automatic Repeat reQuestion (HARQ), asynchronous hybrid Automatic Repeat reQuestion (HARQ) may be used to provide more flexibility in scheduling and multiplexing different users. With asynchronous hybrid Automatic Repeat reQuestion (HARQ), the time interval between transmissions of the same packet may not be fixed. The transmitter has the freedom to decide when a packet is retransmitted.

If the resource assignment, or modulation schemes, may be changed during retransmissions, the hybrid Automatic Repeat reQuestion (HARQ) operation is adaptive. In long term evolution (LTE) systems, the hybrid Automatic Repeat reQuestion (HARQ) operation may be both asynchronous and adaptive. Sometimes a receiver might have difficulty in detecting the packet boundary, i.e., difficulty in detecting whether a subpacket is a first sub-packet of a new packet to be transmitted or a retransmission sub-packet of a previous packet. To alleviate this problem, a new packet indicator may be transmitted in the control channel that carries transmission format information for the packet. Sometimes, a more elaborated version of hybrid Automatic Repeat reQuestion (HARQ) channel information, such as sub-packet identifier (ID), or even hybrid Automatic Repeat reQuestion (HARQ) channel ID, may be transmitted to help the receiver detect and decode the packet.

In a long term evolution (LTE) system, when the size of transport block is large, the transport block is segmented into multiple code blocks so that multiple coded packets may be generated, which is advantageous because of benefits such as enabling pipeline or parallel processing implementation and flexible trade off between power consumption and hardware complexity. In the case of multiple code blocks, a rate matching process may be executed for per code block. During the rate matching process, the hybrid Automatic Repeat reQuestion (HARQ) functionality selects a number of bits at the output of the channel coder to match the total number of bits that the physical channel can carry. The hybrid Automatic Repeat reQuestion (HARQ) functionality is controlled by redundancy version (RV) parameters. The exact set of bits at the output of the hybrid Automatic Repeat reQuestion (HARQ) functionality depends on the number of input bits, the number of output bits, and the redundancy version (RV) parameters. A circular buffer based rate matching process is adopted in the long term evolution (LTE) systems.

Each code block C may be separated, at the turbo encoder output, into a systematic bit stream S, a first parity stream P1, and a second parity stream P2. Four redundancy versions (RVs) may be defined, each of which specifies a starting bit index in the buffer. The transmitter chooses one RV for each hybrid Automatic Repeat reQuestion (HARQ) transmission. The transmitter reads a block of coded bits from the buffer, starting from the bit index specified by a chosen RV while removing filler bits and dummy bits. If the maximum capacity of the buffer is reached and more coded bits are needed for transmission, the transmitter wraps around and continues at the beginning of the buffer, hence the term of "circular buffer" is generated.

The circular buffer based rate matching may be implemented in long term evolution (LTE) for downlink shared channel (DL_SCH) and uplink shared channel (UL_SCH).

A receiver however sometimes may have difficulties in detecting the packet boundary, i.e., difficulty in defining whether a subpacket is the first sub-packet of a new packet or a retransmission sub-packet. Failures of informing the receiver a transmission of a new packet may either degrade the efficiency of packet transmitting and coding rate through the re-transmission, or induce deterioration of the quality of received packet.

SUMMARY OF THE INVENTION

It is therefore one object of the present invention to provide an improved method of rate matching process to improve the efficiency of the hybrid Automatic Repeat reQuestion (HARQ) operation.

It is another object of the present invention to provide a method of rate matching process of the hybrid Automatic Repeat reQuestion (HARQ) operation in which coded bits are selected for a transmission of a packet in dependence upon whether this transmission is a first transmission of a new packet or a retransmission for an existing packet.

In one embodiment of the present invention, a group of coded bits selected for a transmission depends on whether the transmission is the first transmission of a new packet or a retransmission for an existing packet. Therefore, the group of coded bits selected for a transmission of a packet not only depends on the redundancy version, but also on whether the transmission is the first transmission of a packet.

In another embodiment of the present invention, in downlink of long term evolution (LTE), a downlink grant message is transmitted along with the packet data transmission. The grant message may contain a redundancy version (RV), and a new data indicator (NDI) to indicate the start of a new packet. The purpose of indicating the RV is to allow the receiver to correctly identify where in a circular buffer the received signal in this transmission should be placed. The purpose of the new data indicator (NDI) is to allow the receiver to correctly identify the start of transmitting a new packet such that the receiver may flush the buffer upon starting transmitting a new packet. The transmitter could set the new data indicator (NDI) bit for each transmission of the same packet. This will result in the receiver flushing the buffer for every transmission, making the Automatic Repeat reQuestion (HARQ) operation become effectively Automatic Repeat reQuestion (ARQ) operation since the channel decoding will not use the received signals of previous transmissions.

In still another embodiment of the present invention, a pointer may wrap around the circular buffer and starts from the beginning of the buffer. In other words, the receiver may flush the buffer upon the start of transmitting a new packet.

In still another embodiment of the present invention, the pointer points the position of the selected bit in the buffer. When the new data indicator (NDI) is set to one, the pointer moves in a clockwise direction in the buffer; and when the new data indicator (NDI) is set to zero, the pointer moves in a counter clockwise direction in the buffer.

In still another embodiment of the present invention, when the new data indicator (NDI) is set to zero, the pointer moves in a clockwise direction in the buffer; and when the new data indicator (NDI) is set to one, the pointer moves in a counter clockwise direction in the buffer.

In still another embodiment of the present invention, there may be no direct relationship between the value of the new data indicator (NDI) and the direction of the pointer movement.

In still another embodiment of the present invention, the starting position of the redundancy version (RV) may be adjusted based on the value of new data indicator the (NDI).

In still another embodiment of the invention, the starting position of the RV may not be in dependence on the value of a direction indication (DIR).

In still another embodiment of the present invention, same redundancy version (RV) is used for two transmissions of the same packet, while setting the new data indicator (NDI) indicator to '1' for one transmission and '0' for the other transmission. Therefore, the selected bits in these two transmissions are guaranteed to be contiguous in the circular buffer, except the wrapping around effect at the end of the buffer. Therefore, the effective coding rate across these two transmissions may be maximized.

In still another embodiment of the present invention, the direction of the pointer movement may be fixed and the starting point of the redundancy version (RV) definition may be changed according to the new data indicator (NDI) value.

In still another embodiment of the present invention, the interpretation of the value of at least one field of a control message depends on the value of the new data indicator that is embedded in the control message.

In still another embodiment of the present invention, at least two different redundancy versions are defined at same starting positions.

In still another embodiment of the present invention, RVs of even number moves the pointer in a clockwise direction in the buffer, and RVs of odd number moves the pointer in a counter-clockwise direction in the buffer.

In still another embodiment of the present invention, a value, i.e., the direction indication (DIR) is employed to indicate the movement of pointer in the circular buffer. Therefore, the redundancy version (RV) definition scheme may be viewed as using a one-bit redundancy version bit (RVB) and a one-bit direction indication (DIR). A mapping from RVB and DIR to redundancy version (RV) is introduced.

In still another embodiment of the present invention, a two-bit RV value is used together with a one-bit DIR value, and thus a total of 8 (0-7, i.e., 000-111 represented in three-bit value) extended redundancy versions (ERVs) may be defined. A mapping from redundancy version (RV) and direction indication (DIR) to extended redundancy versions (ERV) is introduced.

In still another embodiment of the present invention, one redundancy version (RV) may move the pointer in either of the clockwise direction or the counter clockwise direction in the buffer.

In still another embodiment of the present invention, the extended redundancy version (ERV) may be jointly defined by the new data indicator and the redundancy version. The mapping from (RV, NDI) to ERV may be arbitrary. Preferably, a one-to-one mapping is defined. For example, the ERV may be mapped to as ERV=2×RV+NDI. The coded bits or soft values are read or written into the buffer, starting from a position defined by the extended redundancy version (ERV).

In another embodiment of the present invention, the rate matching process that at transmitter side selects bits from a transmitter buffer (or at receiver side, or at an input to the decoder of the receiver, the rate matching process that writes soft values to a receiver buffer) depends on the value of the new data indication (NDI) set for at least a first redundancy version, while the rate matching process that at transmitter side selects bits from the transmitter buffer (or at receiver side, or at an input to the decoder of the receiver, the rate matching process that writes soft values to a receiver buffer) operates regardless of the value of the new data indicator for at least a second redundancy version.

In another embodiment of the present invention, for the first transmission of a new data (RV=0), NDI=1 and the pointer moves clockwise; for retransmissions (NDI=0) and the pointer moves counter-clockwise regardless of the value of redundancy version (RV).

In another embodiment of the present invention, when combining new data indicator (NDI) with a subset of RVs, RVs other than RV=0 may be used to allow rate matching process to operate in dependence upon the value of the NDI. The rate matching process may operate in dependence upon the value of the NDI for more than one redundancy version (RV).

In another embodiment of the present invention, both of the direction of pointer movement and the starting position of RVs may be in dependence upon the value of new data indicator (NDI) at same time.

In another embodiment of the present invention, the first transmission of a new packet is indicated by at least one value of the redundancy version. In other words, at least one value of redundancy version is used only when a new packet is starting to be sent.

In another embodiment of the present invention, a plurality of RVs may share or at least one starting position of the RV for bit selection in the rate matching process, with at least one of the plurality of RVs only used for new packet transmission.

In another embodiment of the present invention, the improved method of rate matching may be implanted into either a transmitter or a receiver. The implementation of rating matching to either transmitter or receiver may be achieved together with other processes such as rate matching due to buffer size limitation, sub-block interleaving, bit selection for a given redundancy version, filler bits padding/depadding, dummy bits insertion/pruning, modulation, channel interleaving, and mapping modulation symbols to physical resources, etc.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Currently, hybrid Automatic Repeat reQuestion (HARQ) is widely used in communication systems to combat decoding failure and improve reliability. In a data communication system, each data packet is protected by using a certain forward error correction (FEC) coding scheme. Each subpacket may only contain a portion of coded bits of the entire packet. The process of selecting coded bits to be transmitted in a subpacket may be called subpacket generation, or rate matching.

Figure 1:
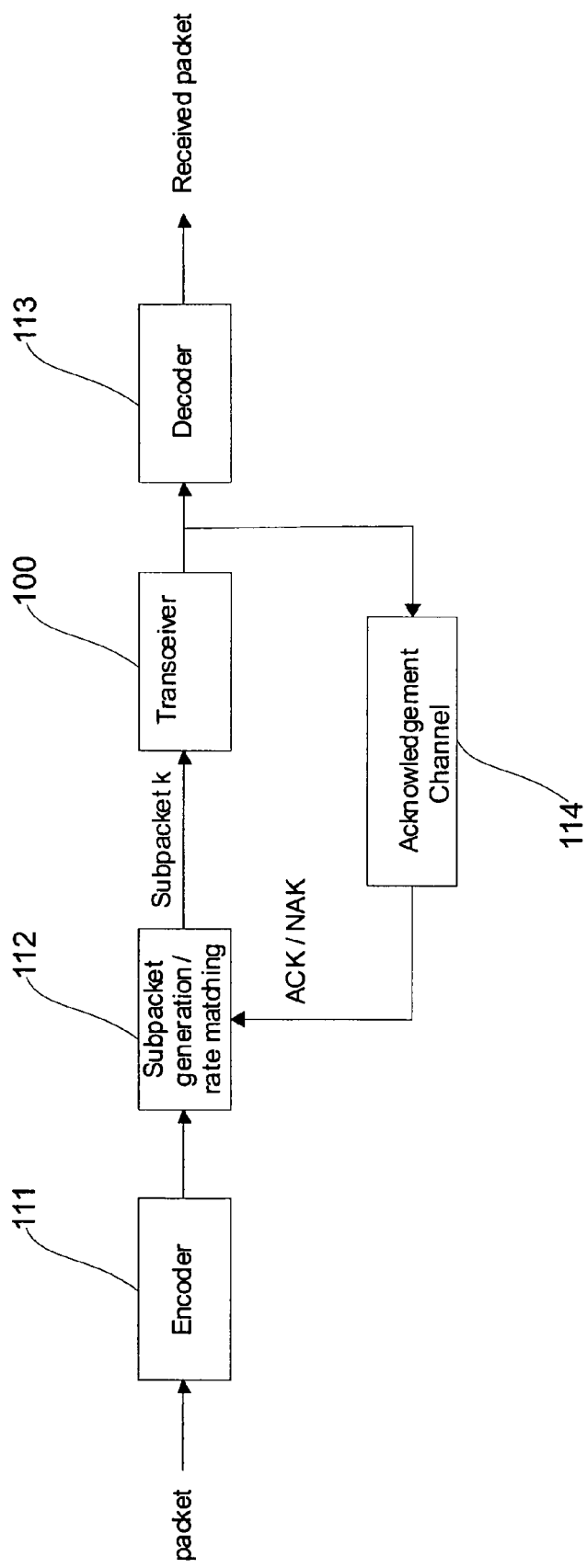
FIG. 1 is a diagram illustrating an operation of a contemporary hybrid Automatic Repeat reQuestion (HARQ) operation.

A contemporary hybrid Automatic Repeat reQuestion (HARQ) operation is shown in FIG. 1. A data packet is coded by an encoder 111 with a certain kind of Forward Error Correction (FEC) scheme. The data packet is processed by a subpacket generation/rate matching stage 112 and thus a set of subpackets are generated. For example, a subpacket k may only contain a portion of the coded bits. If the transmission of subpacket k by a transceiver 100 fails, as indicated by a negative acknowledgement (NAK) message provided by a feedback acknowledgement channel 114, a retransmission subpacket, subpacket k+1, is provided to retry the transceive of this data packet. If subpacket k+1 is successfully transceived, an acknowledgement (ACK) is provided by feedback acknowledgement channel 114. The retransmission subpackets may contain different coded bits from previous subpackets. The receiver may softly combine or jointly decode all the received subpackets by a decoder 113 to improve the chance of decoding. Normally, a maximum number of transmissions is configured in consideration of reliability, packet delay, and implementation complexity.

N-channel synchronous hybrid Automatic Repeat reQuestion (HARQ) are widely used in wireless communication systems because of the simplicity of the N-channel synchronous hybrid Automatic Repeat reQuestion (HARQ). For example, synchronous hybrid Automatic Repeat reQuestion (HARQ) has been accepted as the hybrid Automatic Repeat reQuestion (HARQ) scheme for LTE uplink in 3GPP.

Figure 2:
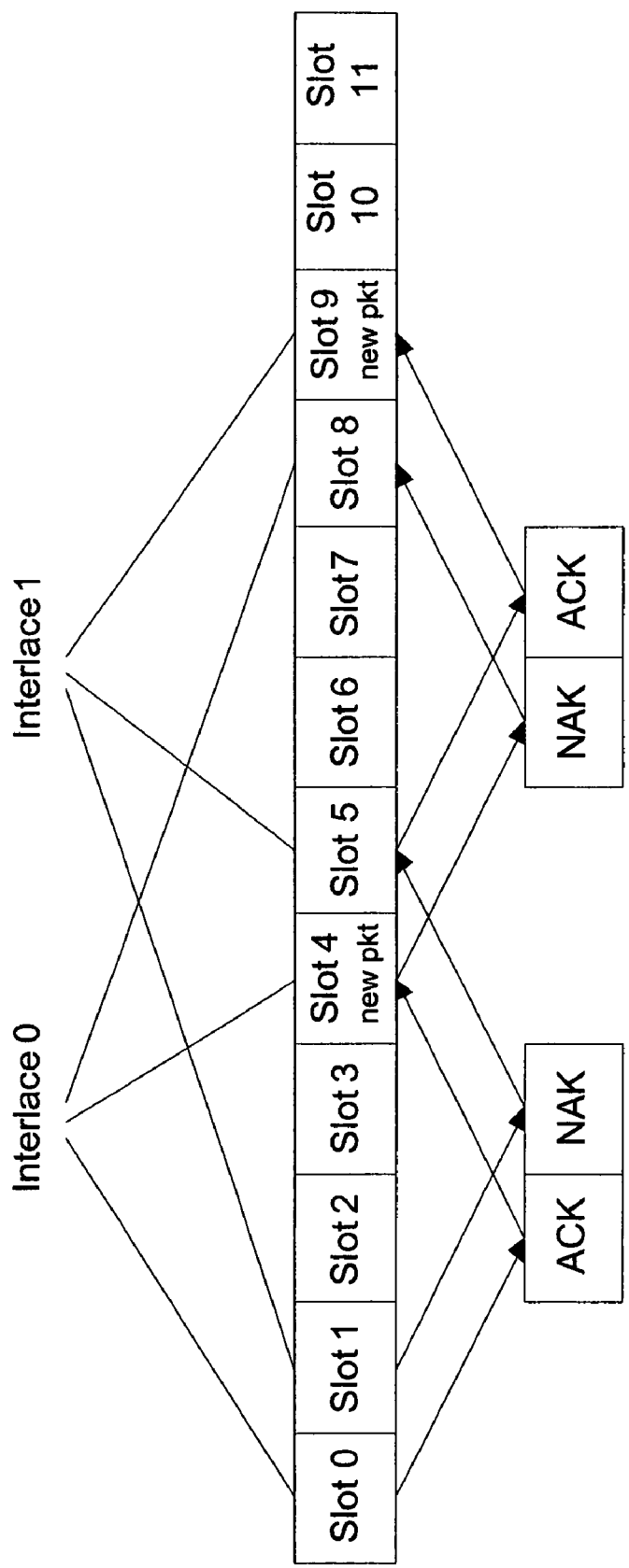
FIG. 2 is an illustration showing an example of a 4-channel synchronous hybrid Automatic Repeat reQuestion (HARQ) operation.

FIG. 2 shows an example of a 4-channel synchronous hybrid Automatic Repeat reQuestion (HARQ). Due to fixed timing relationship between subsequent transmissions, the transmission slots in the same hybrid Automatic Repeat reQuestion (HARQ) channel exhibits an interlace structure.

Because of the fixed timing relationship between subsequent transmissions, the transmission slots in an individual hybrid Automatic Repeat reQuestion (HARQ) channel exhibits an interlace structure. For example, interlace 0 includes slot 0, 4, 8, . . . , 4k, . . . ; interlace 1 includes slot 1, 5, 9, . . . , 4k+1, . . . ; interlace 2 includes slot 2, 6, 10, . . . , 4k+2, . . . ; interlace 3 includes slot 3, 7, 11, . . . 4k+3, . . . . A packet is transmitted at slot 0. After correctly decoding the packet, the receiver sends back an ACK acknowledgement to the transmitter. The transmitter then starts transmitting a new packet at the next slot in this interlace, i.e., slot 4. The first subpacket of the new packet transmitted in slot 4, however, is not properly received. After the transmitter receives a NAK negative acknowledgement from the receiver, the transmitter transmits another sub-packet of the same packet at the next slot in interlace 0, i.e., slot 8. Sometimes the receiver may have difficulty in detecting the packet boundary, i.e., difficulty in detecting whether a subpacket is the first sub-packet of a new packet or a retransmission sub-packet. Interlaces 1-3 act same as interlace 0, To alleviate this problem, a new packet indicator may be transmitted in a control channel which carries transmission format information for the packet. Sometimes, a more elaborated version of hybrid Automatic Repeat reQuestion (HARQ) channel information, such as sub-packet ID, and/or hybrid Automatic Repeat reQuestion (HARQ) channel ID, may be provided to help the receiver detect and decode the packet.

Instead of synchronous hybrid Automatic Repeat reQuestion (HARQ), asynchronous hybrid Automatic Repeat reQuestion (HARQ) may provide more flexibility in scheduling and multiplexing different users. With asynchronous hybrid Automatic Repeat reQuestion (HARQ), the time interval between transmissions of the same packet may not be fixed. The transmitter has freedom to decide when a packet is retransmitted.

Figure 3:
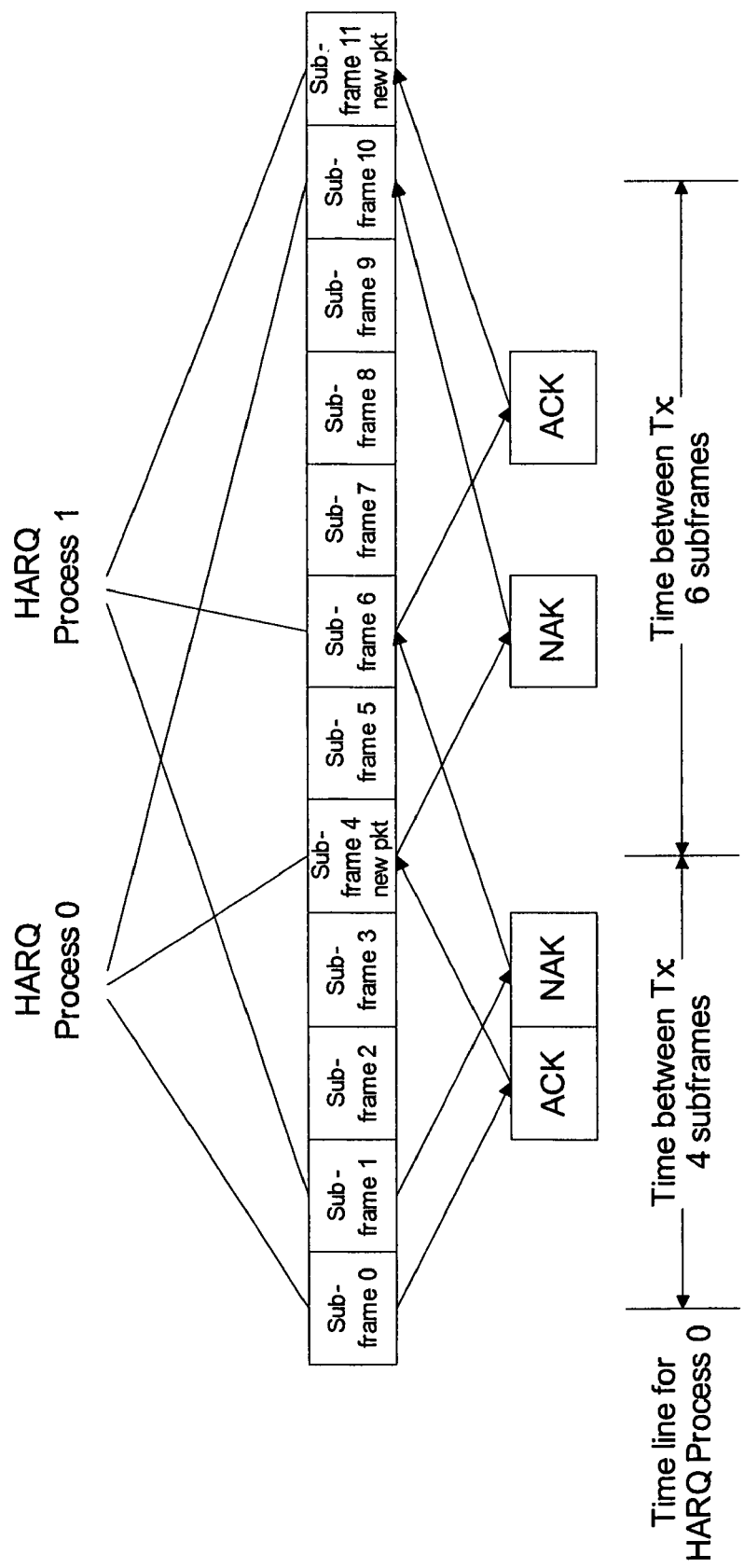
FIG. 3 is an illustration showing an example of an asynchronous hybrid Automatic Repeat reQuestion (HARQ) operation.

An example of asynchronous hybrid Automatic Repeat reQuestion (HARQ) is shown in FIG. 3.

For HARQ process 0, a first time interval between two transmissions, for example, transmissions of subframe 0 and subframe 4, is four subframes; the second time interval between two transmissions, for example, transmissions of subframe 4 and subframe 10, is six subframes. After correctly decoding the packet, the receiver sends back an ACK acknowledgement to the transmitter. The transmitter then starts transmitting a new packet at the next subframe in this HARQ process, i.e., subframe 4.

For HARQ process 1, a first time interval between two transmissions, for example, transmissions of subframe 1 and subframe 6, is five subframes; the second time interval between two transmissions, for example, transmissions of subframe 6 and subframe 11, is five subframes. The first subpacket of the new packet transmitted in subframe 1 is not properly received. When the transmitter receives a NAK negative acknowledgement from the receiver, the transmitter transmits another sub-packet of the same packet at the next subframe in HARQ process 1, i.e., subframe 6. After correctly decoding the packet, the receiver sends back an ACK acknowledgement to the transmitter. The transmitter then starts transmitting a new packet at the next subframe in this HARQ process, i.e., subframe 11.

If the resource assignment, or modulation schemes, may be changed during retransmissions, the hybrid Automatic Repeat reQuestion (HARQ) operation is adaptive. In long term evolution (LTE) systems, the hybrid Automatic Repeat reQuestion (HARQ) operation is both asynchronous and adaptive. Sometimes a receiver might have difficulty in detecting the packet boundary, i.e., difficulty in detecting whether a subpacket is the first sub-packet of a new packet or a retransmission sub-packet. To alleviate this problem, a new packet indicator may be transmitted in the control channel that carries transmission format information for the packet. Sometimes, a more elaborated version of hybrid Automatic Repeat reQuestion (HARQ) channel information, such as sub-packet identifier (ID), or even HARQ channel ID, may be transmitted to help the receiver detect and decode the packet.

In a long term evolution (LTE) system, when the size of transport block is large, the transport block is segmented into multiple code blocks so that multiple coded packets may be generated, which is advantageous because of benefits such as enabling pipeline or parallel processing implementation and flexible trade off between power consumption and hardware complexity. In the case of multiple code blocks, the rate matching may be operated for per code block. During the rate matching process, the hybrid ARQ functionality selects a number of bits at the output of the channel coder to match the total number of bits that the physical channel can carry. The functionality of hybrid ARQ is controlled by the redundancy version (RV) parameters. The exact set of bits at the output of the hybrid ARQ functionality depends on the number of input bits, the number of output bits, and the RV parameters. Circular buffer based rate matching is adopted in the long term evolution (LTE) systems.

Figure 6:
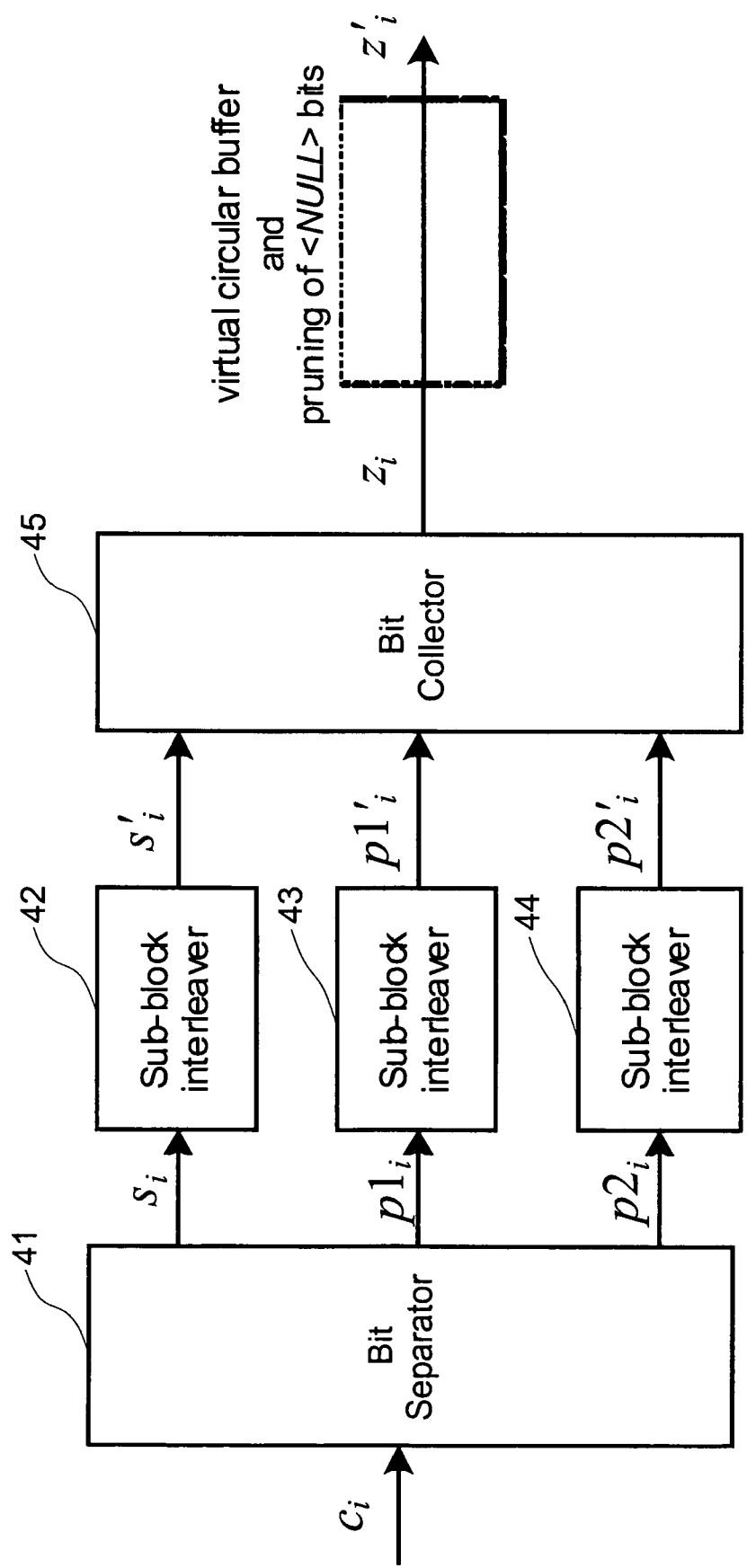
FIG. 6 shows an operation of the circular buffer in the rate matching process in a transmitter.

Turning now to FIG. 6 and FIG. 6 shows an operation of the circular buffer in the rate matching process in a transmitter.

Each of code block C (including multiple bits, namely $c_i$) is separated into three bit streams at the turbo encoder output, namely, systematic bit stream S (including multiple bits, namely $s_i$), first parity stream P1 (including multiple bits, namely $p1_i$), and second parity stream P2 (including multiple bits, namely $p2_i$). Four redundancy versions (RVs) are defined, each of which specifies a starting bit index in the buffer. The transmitter chooses one RV for each HARQ transmission. The transmitter reads a block of coded bits from the buffer, starting from the bit index specified by a chosen RV while removing filler bits and dummy bits. If the maximum capacity of the buffer is reached and more coded bits are needed for transmission, the transmitter wraps around and continues at the beginning of the buffer, hence the term of "circular buffer" is generated.

Figure 4:
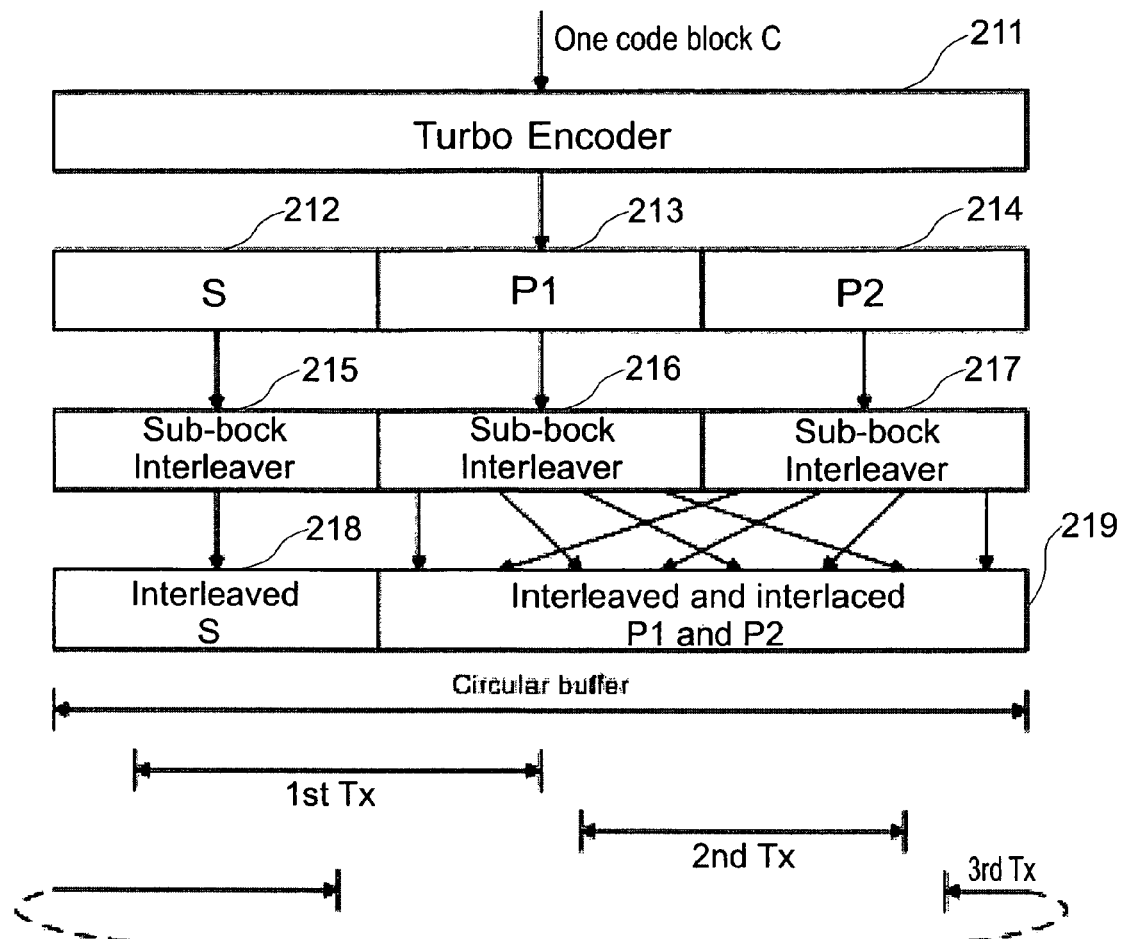
FIG. 4 is a diagram showing a rate matching process by employing a circular buffer.

The circular buffer rate matching is illustrated pictorially in FIG. 4. Alternatively, the circular buffer may be illustrated as a circle as shown in FIG. 5.

As shown in FIG. 4, one code block C is put into a turbo encoder 211. A turbo encoder is formed by parallel concatenation of two recursive systematic convolutional (RSC) encoders separated by an interleaver. Code block C is separated into a systematic bit stream S 212 (including multiple bits, namely $s_i$), a first parity stream P1 213 (including multiple bits, namely $p1_i$), and a second parity stream P2 214 (including multiple bits, namely $p2_i$). Systematic bit stream S 212 is input into a sub-block interleaver 215, first parity stream P1 213 is input into a sub-block interleaver 216, and second parity stream P2 is input into a sub-block interleaver 217. Systematic bit stream S 212 is then transformed to interleaved systematic bit stream S 218. The first parity stream P1 213 and second parity stream P2 214 are transformed into interleaved and interlaced parity stream 219. The transmitter reads a block of coded bits from the buffer, starting from the bit index specified by a chosen RV while removing the filler bits and dummy bits in steps of first transmission ($1^{st}$ TX) and retransmissions (e.g., $2^{nd}$ TX and $3^{rd}$ TX). If the maximum capacity of the buffer is reached and more coded bits need to be transmitted, the transmitter wraps around and continues from the beginning of the buffer.

Figure 5:
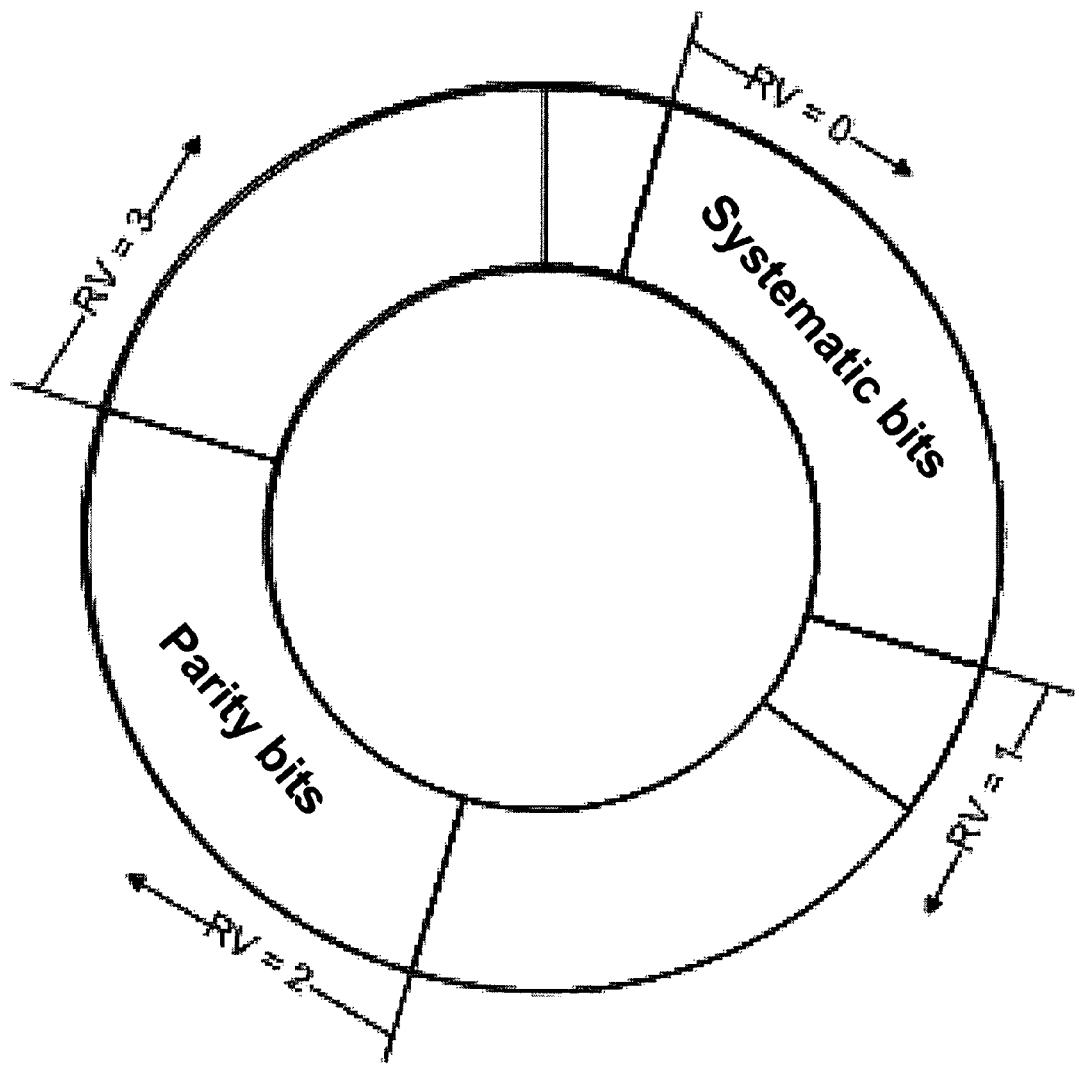
FIG. 5 is an illustration illustrating the circular illustrated as a circle.

As shown in FIG. 5, a circular buffer is filled by systematic bits and parity bits. The bits in the circular buffer are specified by different redundancy versions (RVs), i.e., RV=0, RV=1, RV=2, and RV=3. The transmitter removes filler bits and dummy bits starting from a predetermined RV. When the maximum capacity of the buffer is reached and more coded bits are needed for transmission, the transmitter wraps around and continues at the beginning of the buffer. In FIG. 5, the buffer is represented as a circle to show that the transmitter may continue from the beginning of the buffer when the maximum capacity of the buffer is reached. Therefore, the term of "circular buffer" is generated.

As an example, the circular buffer rate matching is implemented in long term evolution (LTE) for downlink shared channel (DL_SCH) and uplink shared channel (UL_SCH) as illustrated in FIG. 6.

The bits input to the rate matching are denoted by $c_0, c_1, c_2, \ldots, c_{E-1}$, where E is the number of bits input to the rate matching block. Note that E is a multiple of 3. The bits after bit separator 41 are denoted by $s_0, s_1, s_2, \ldots, s_{K'-1}; p_{1,0}, p_{1,1}, p_{1,2}, \ldots, p_{1,K'-1}$ and $p_{2,0}, p_{2,1}, p_{2,2}, \ldots, p_{2,K'-1}$, where K' is the number of bits in each separated bit sequence. The relation between the input sequence and the output sequences is given below.

| | | |
|---|---|---|
| $s_k = c_{3k}$, | $k = 0, 1, 2, \ldots, K' - 1$ | K' = E/3 (1) |
| $p1_k = c_{3k+1}$, | $k = 0, 1, 2, \ldots, K' - 1$ | K' = E/3 (2) |
| $p2_k = c_{3k+2}$, | $k = 0, 1, 2, \ldots, K' - 1$ | K' = E/3 (3) |

Note that K'=K+4 is the length of the code block, including tail bits.

The information bit stream $s_i$ is interleaved by a sub-block interleaver 42 with an output sequence defined as $v_0, v_1, v_2, \ldots, v_{K''-1}$, and yielding the bit stream $$s'_i = v_i \text{ for } i=0, \ldots, K''-1 \quad (4)$$

where $K''=\lceil K'/32 \rceil \times 32$ is the size of the sub-block interleaver. The parity bit stream $p1_i$, is interleaved according to a sub-block interleaver 43 with an output sequence defined as $v_0, v_1, v_2, \ldots, v_{K''-1}$, and yielding the bit stream $$p1'_i = v_i \text{ for } i=0, \ldots, K''-1. \quad (5)$$

The parity bit stream $p2_i$ is interleaved according to a sub-block interleaver 44 with an output sequence defined as $v_0, v_1, v_2, \ldots, v_{K''-1}$, and yielding the bit stream $$p2'_i = v_i \text{ for } i=0, \ldots, K''-1. \quad (6)$$

The sub-block interleaving is a block interleaver and consists of bits input to a matrix with padding, the inter-column permutation for the matrix and bits output from the matrix. The bits input to the block interleaver are denoted by u0, u1, u2, . . . , u(K'-1), where K' is the number of input bits. The output bit sequence from the block interleaver is derived as follows:

1. Assign C=32 to be the number of columns of the matrix. The columns of the matrix are numbered 0, 1, 2, . . . , C−1 from left to right.

2. Determine the number of rows of the matrix, R, by determining the minimum integer R such that $K' \leq R \times C = K''$. The rows of rectangular matrix are numbered 0, 1, 2, . . . , R−1 from top to bottom.

3. If K''>K', then a number of $N_D=(K''-K')$ dummy bits are padded such that $x_k$=<NULL> for k=0, 1, . . . , $N_D$−1, and $x_{N_D+k}=u_k$ for k=0, 1, . . . , K'−1. If the input bit sequence is second parity stream $p2_i$, the padded bit sequence is cyclically shifted such that $y_k=x_{(k+1)\% K''}$ for k=0, 1, . . . , K''−1; otherwise, $y_k=x_k$, for k=0, 1, . . . , K''−1. Then, write the resulted sequence into the R×C matrix row by row starting from bit $y_0$ in the position of column 0 of row 0:

$$\begin{bmatrix} y_0 & y_1 & y_2 & \cdots & y_{C-1} \\ y_C & y_{C+1} & y_{C+2} & \cdots & y_{2C-1} \\ \vdots & \vdots & \vdots & \ddots & \vdots \\ y_{(R-1)\times C} & y_{(R-1)\times C+1} & y_{(R-1)\times C+2} & \cdots & y_{(R\times C-1)} \end{bmatrix} \quad (7)$$

4. The inter-column permutation is performed for the matrix based on the pattern $\langle P(j) \rangle_{j \in \{0, 1, \ldots, C-1\}}$ as shown in Table 1 (Table 1 is the Inter-column permutation pattern for sub-block interleaver), where P(j) is the original column position of the j-th permuted column. After permutation of the columns, the inter-column permuted R×C matrix becomes:

$$\begin{bmatrix} y_{P(0)} & y_{P(1)} & y_{P(2)} & \cdots & y_{P(C-1)} \\ y_{P(0)+C} & y_{P(1)+C} & y_{P(2)+C} & \cdots & y_{P(C-1)+C} \\ \vdots & \vdots & \vdots & \ddots & \vdots \\ y_{P(0)+(R-1)\times C} & y_{P(1)+(R-1)\times C} & y_{P(2)+(R-1)\times C} & \cdots & y_{P(C-1)+(R-1)\times C} \end{bmatrix} \quad (8)$$

5. The output of the block interleaver is the bit sequence read out column by column from the inter-column permuted R×C matrix. The bits after sub-block interleaving are denoted by $v_0, v_1, v_2, \ldots, v_{K''-1}$, where $v_0$ corresponds to $y_{P(0)}$, $v_1$ to $y_{P(0)+C}$, and so on.

TABLE 1

Inter-column permutation pattern for sub-block interleaver

| Number of columns C | Inter-column permutation pattern <P(0), P(1), . . . , P(C − 1)> |
|---|---|
| 32 | <0, 16, 8, 24, 4, 20, 12, 28, 2, 18, 10, 26, 6, 22, 14, 30, 1, 17, 9, 25, 5, 21, 13, 29, 3, 19, 11, 27, 7, 23, 15, 31> |

For a transmission, the circular buffer of length $K_z=3K''$ for the r-th coded block is defined as equations (9) to (11):

| | | |
|---|---|---|
| $z_i = s'_i$ | for $i = 0, \ldots, K''-1$ | (9) |
| $z_{K''+2i} = p1'_i$ | for $i = 0, \ldots, K''-1$ | (10) |
| $z_{K''+2i+1} = p2'_i$ | for $i = 0, \ldots, K''-1$ | (11) |

$K_{rm}$ is the rate matching output sequence length for this coded block, and $rv_{idx}$ is the redundancy version number for this transmission, $z'_i$ is the rate matching output bit sequence after bit collector 45 where $i=0, 1, \ldots, K_{rm}-1$. The output bit sequence may be selected according to the following procedure:

```
Set k₀ = R×(24×rv_idx + 2)
Set i = 0 and j = 0
while { i < K_rm }
    if z_(k₀+j)%Kz ≠ < NULL >
        z'_i = z_(k₀+j)%Kz
        i = i +1
        j = j +1
    else
        j = j +1
    end if
end while
``` where $k_0$ is the starting position of an RV, i is the index of the selected bits and j is the index of original bits.

Therefore, in contemporary methods of packet transmitting as shown in FIGS. 2 and 3, a receiver sometimes may have difficulty in detecting the packet boundary, i.e., difficulty in defining whether a subpacket is the first sub-packet of a new packet or a retransmission subpacket. Failures of informing the receiver a transmission of a new packet may either degrade the efficiency of packet transmitting and coding rate through the re-transmission, or induce deterioration of the quality of received packet.

In this invention, designs are proposed to improve the performance of rate matching for hybrid ARQ operations.

Aspects, features, and advantages of the invention are readily apparent from the following detailed description, simply by illustrating a number of particular embodiments and implementations, including the best mode contemplated for carrying out the invention. The present invention is also capable of other and different embodiments, and its several details may be modified in various obvious respects, all without departing from the spirit and scope of the invention. Accordingly, the drawings and description are to be regarded as illustrative in nature, and not as restrictive. The present invention is illustrated by way of example, and not by way of limitation, in the figures of the accompanying drawings.

In one embodiment of the present invention, the set of coded bits selected for a transmission depends on whether the transmission carries the first transmission of a new packet or a retransmission for an existing packet. By doing so, the set of coded bits selected for a transmission of a packet not only depends on the redundancy version, but also on whether the transmission is the first transmission of a packet. For example, in downlink of LTE, a downlink grant message is transmitted along with the packet data transmission. The grant message may contain the redundancy version (RV), and a new data indicator (NDI) to indicate the start of a new packet. The purpose of indicating the RV is to allow the receiver to correctly identify where in the buffer the received signal in this transmission should be placed. The purpose of the new data indicator (NDI) is to allow the receiver correctly identifying the start of a packet such that the receiver can flush the buffer upon the start of a new packet. Without the NDI, it would be difficult for the receiver to know whether a transmission is a retransmission for the previous packet or a transmission for a new packet. The transmitter could set the NDI bit for each transmission of the same packet. This will result in the receiver flushing the buffer for every transmission, making the hybrid Automatic Repeat reQuestion (HARQ) operation become effectively ARQ operation since the channel decoding will not use the received signals of previous transmissions. The new data indicator in the present invention is not only an identifier of boundary of data packets but also is employed to select coded bits to be transmitted.

For example, one way of implementing this idea is described as follows. For a transmission, the circular buffer of length $K_z=3K''$ for the r-th coded block is defined as follows:

| | | |
|---|---|---|
| $z_i = s'_i$ | for $i = 0, \ldots, K''-1$ | (12) |
| $z_{K''+2i} = p1'_i$ | for $i = 0, \ldots, K''-1$ | (13) |
| $z_{K''+2i+1} = p2'_i$ | for $i = 0, \ldots, K''-1$ | (14) |

Denoting by $K_{rm}$ the rate matching output sequence length for this coded block, and $rv_{idx}$ the redundancy version number for this transmission, the rate matching output bit sequence is $z'_i$, $i=0, 1, \ldots, K_{rm}-1$. The output bit sequence may be selected according to the following procedure:

```
if (NDI = 1)
    γ = +1
else
    γ = -1
end if
Set k₀ = R×(24×rv_idx + 2)
Set i = 0 and j = 0
while { i < K_rm }
    if z_(k₀+j)%Kz ≠ < NULL >
        z'_i = z_(k₀+j)%Kz
        i = i +1
        j = j +γ
    else
        j = j +γ
    end if
end while
``` where $k_0$ is the starting position of an RV, i is the index of the selected bits, j is the index of original bits and γ refers to a direction of a pointer's movement in the buffer.

In this example, R is the minimum integer R such that $K' \leq R \times C = K''$ with C=32 is the number of columns in the sub-block interleaver. In other words, $R=\lceil K'/32 \rceil$ is the number of rows of the sub-block interleaver used in the circular buffer rate matching. In the example of above stated example, the starting position of an RV is defined as $k_0=R\times(24\times rv_{idx}+2)$ regardless of the value of NDI. The starting position of an RV, as another embodiment of the present invention, may be adjusted based on the value of NDI. One simple example is to use $k_0=R\times(24\times rv_{idx}+2)$ when NDI='1', and use $k_0=R\times(24\times rv_{idx}+2)-1$ when NDI='0'. In this way, the bit at position $R\times(24\times rv_{idx}+2)$ may be selected when NDI='1' but may not be selected when NDI='0' (unless all other bits in the circular buffer have been selected), thus maximizing the effective coding rate through retransmissions.

Figure 7:
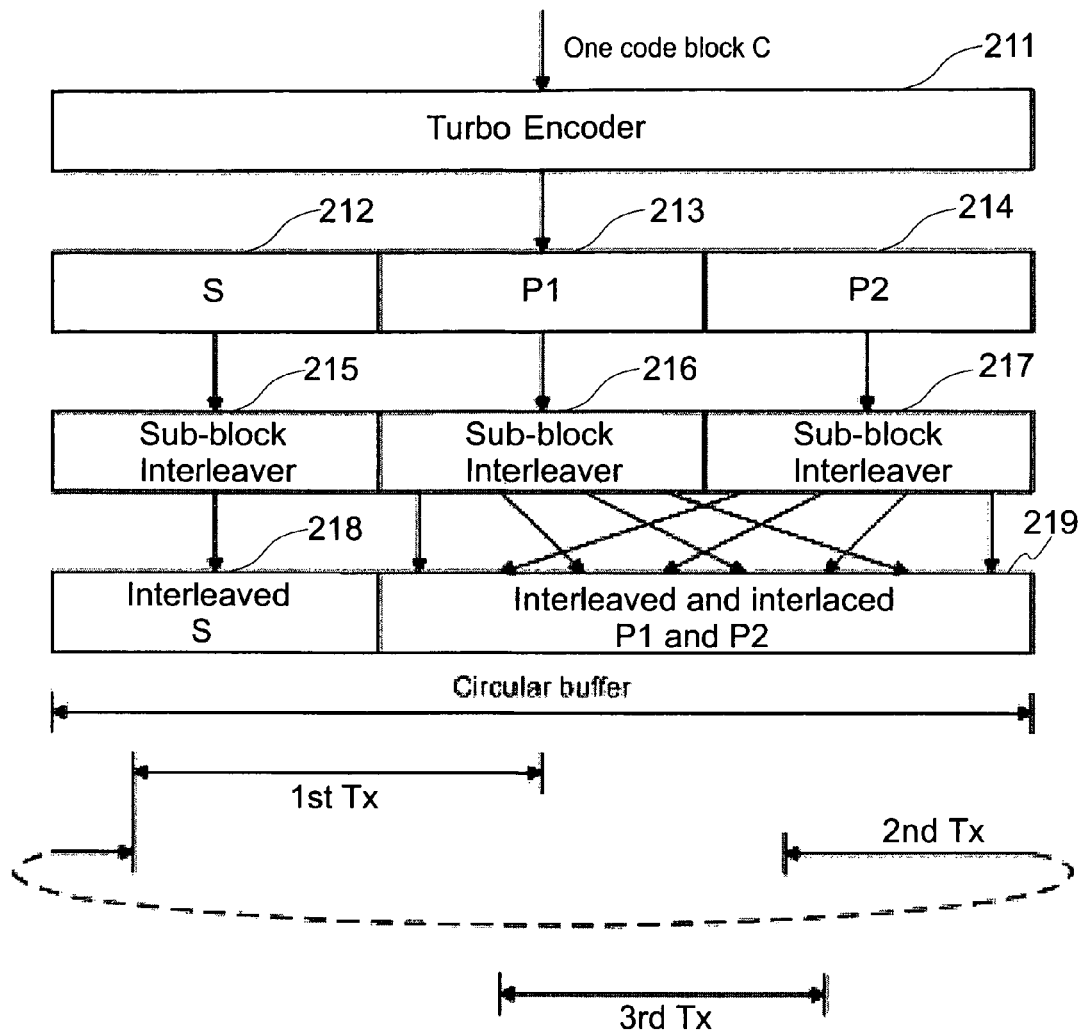
FIG. 7 shows an improved circuit buffer rate matching constructed according to the principles of the present invention.

FIG. 7 shows an improved circuit buffer rate matching constructed according to the principles of the present invention. Same components and processes as shown in the description of FIG. 4 will be omitted. The difference between FIG. 7 and FIG. 4 is that: at the second TX, NDI is set to zero and indicates a retransmission of a packet. The pointer starts from the saved bit index as of the first TX and moves along the opposite direction in the circular buffer.

The transmitter may choose to use same RV for two transmissions of the same packet, while setting the NDI to '1' for one transmission and '0' for the other transmission. By doing so, the selected bits in these two transmissions are guaranteed to be contiguous in the circular buffer, except the wrapping-around effect at the end of the buffer. Therefore, the effective coding rate across these two transmissions may be minimized. Obviously, the two transmissions need not to be continuous in order for this embodiment to apply. In this implementation, the pointer is moved forward ($\gamma=+1$) when NDI='1', and backward ($\gamma=-1$) otherwise. Alternatively, the pointer may be moved backward ($\gamma=-1$) when NDI='1', and forward ($\gamma=+1$) otherwise. Here, $\gamma$ contemplates the position of the pointer.

The order of the bits selected, or the pointer movement, is not important to apply the ideas of this invention. In another embodiment of the invention, the direction of the pointer movement may be fixed and the starting point of the RV definition may be changed according to the NDI value. For example, in LTE DL_SCH and UL_SCH rate matching, the starting point of a redundancy version may be defined as $k_0=(R\times(24\times rv_{idx}+2)+f(rv_{idx}, NDI))\% K_Z$. For example, the starting point of a redundancy version may be defined as $$k_0 = \begin{cases} R\times(\lambda\times rv_{idx}+\alpha_1), & NDI = 1 \\ R\times(\lambda\times rv_{idx}+\alpha_2), & NDI = 0 \end{cases} \quad (15)$$

Preferably, $\alpha_2=\alpha_1+\lambda/2$ to spread the RV starting points across the circular buffer and thus the RVs for the initial transmission and the retransmissions of a packet are evenly distributed across the circular buffer. Here, $\lambda$ indicates the spacing between RVs; $\alpha_1$ and $\alpha_2$ are parameters to adjust the offsets, or the starting positions, for RVs in the case of initial transmission and retransmissions, respectively. If the size of the circular buffer is not limited, preferably, $\lambda=24$. Additionally, so that the RVs for the initial transmission and for the retransmissions are evenly distributed across the circular buffer, the relation between $\lambda$, $\alpha_1$ and $\alpha_2$ may be set with $\alpha_2=\alpha_1+\lambda/2$ as presented above.

In an embodiment of the invention, the interpretation of the value of at least one field of a control message depends on the value of the new data indicator that is embedded in the control message. For example, in the downlink LTE system, a downlink grant message may be transmitted in the same subframe with the data. The grant message contains a new data indicator (NDI) indicating whether the corresponding packet data transmission is for a new packet or a continuation of a previous packet. The grant message may also contain other message fields such as modulation order, resource assignment, MIMO preceding, MIMO rank, etc. The interpretation of all these fields may be dependant on the value of NDI. For example, the same value of the field for modulation order may mean 16-QAM when NDI='1', and may mean QPSK when NDI='0'.

Figure 8:
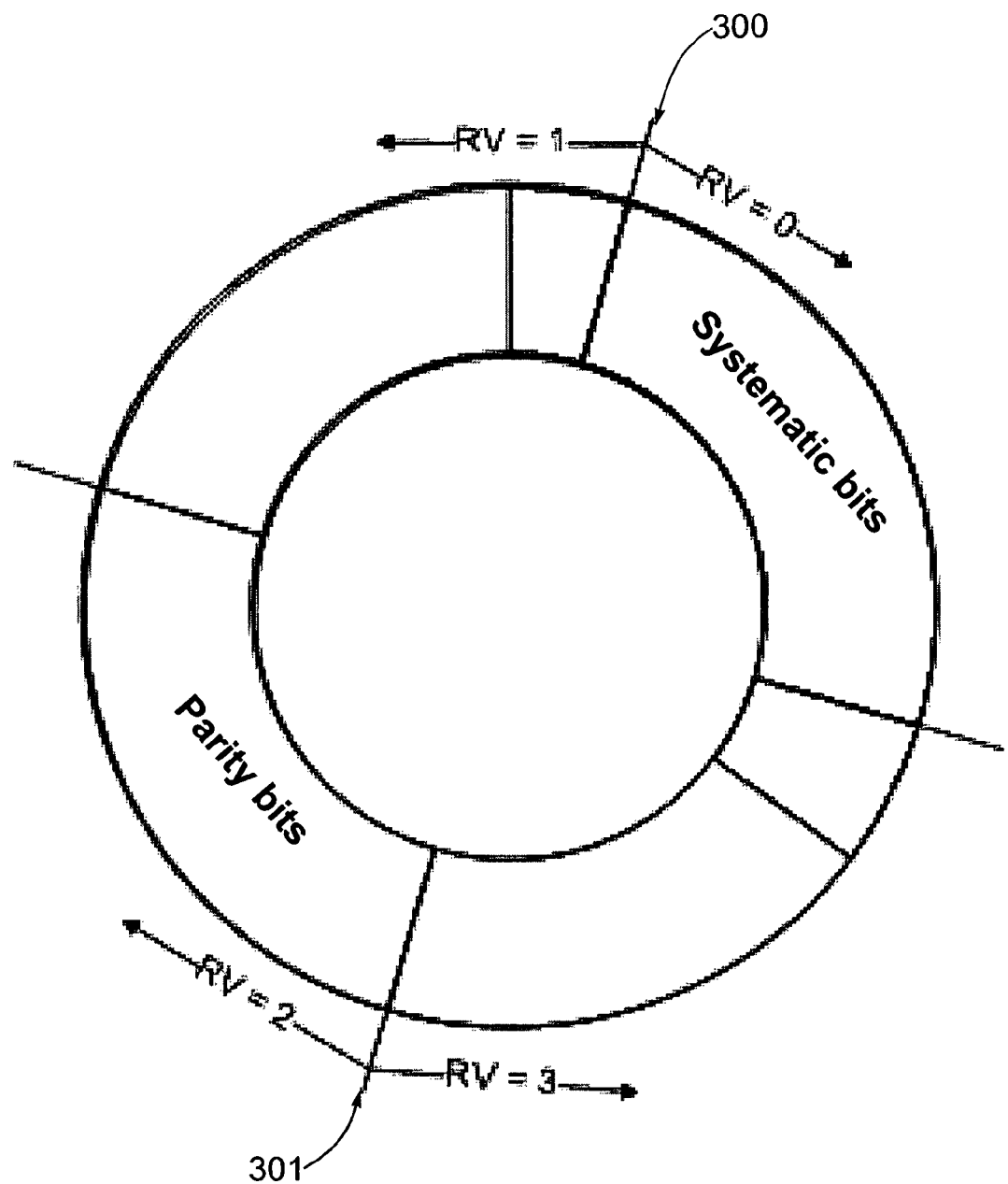
FIG. 8 shows an example of defining at least two different redundancy versions at same starting positions constructed according to the principles of the present invention.

In one embodiment of the invention, at least two different redundancy versions are defined at the same starting positions. One example is shown in FIG. 8. In FIG. 8, RV=0 and RV=1 are defined to have same starting position 300, while RV=2 and RV=3 are defined to have same starting position 301. For example, one possible formula for the starting position for an RV i may be expressed as equation (16):

$$k_0=R\times(48\times\lfloor i/2\rfloor+2), \text{ for } i=0, 1, 2, 3. \quad (16)$$

In the example as shown in FIG. 8, RVs with values of even number (i.e., 0 and 2) will move the pointer in a clockwise direction in the buffer while reading coded bits at transmitter or writing soft values at a receiver, and RVs with values of odd number (i.e., 1 and 3) will move the pointer in a counter-clockwise direction in the buffer. One way to implement this idea is as follows:

---

DIR = $rv_{idx}$ %2
if (DIR = 0)
   $\gamma = +1$
else
   $\gamma = -1$
end if
Set $k_0$ = $R\times(48\times\lfloor rv_{idx}/2\rfloor+2)$
Set i = 0 and j = 0
while { i < $K_{rm}$ }
   if $z_{(k_0+j)\%K_z} \neq$ < NULL >
      $z_i'$ = $z_{(k_0+j)\%K_z}$
      i = i +1
      j = j +$\gamma$
   else
      j = j +$\gamma$
   end if
end while

--- where $rv_{idx}$ is index of RV, $k_0$ is the starting position of an RV, i is the index of the selected bits, j is the index of original bits and $\gamma$ refers to a direction of a pointer's movement in the buffer.

In the example stated above, the starting position of an RV is defined as $k_0=R\times(48\times\lfloor rv_{idx}/2\rfloor+2)$ regardless of the value of DIR, the direction along which the pointer moves in the circular buffer. In another embodiment of the present invention, however, the starting position of an RV may also be adjusted based on the value of DIR. One simple example is to use $k_0=R\times(48\times\lfloor rv_{idx}/2\rfloor+2)$ when DIR='0', and use $k_0=R\times(48\times\lfloor rv_{idx}/2\rfloor+2)-1$ when DIR='1'. In this way, the bit at position $R\times(48\times\lfloor rv_{idx}/2\rfloor+2)$ may be selected when DIR='0', but may not be selected when DIR='1' (unless all other bits in the circular buffer have been selected), and thus maximizing the effective code rate through retransmissions. With this embodiment, if DIR=1, it is only possible to select the bit at position $R\times(48\times\lfloor rv_{idx}/2\rfloor+2)$ after all other bits in the circular buffer have been selected.

Alternatively, a value that indicates the movement of pointer in the circular buffer may be introduced. For example, the RV definition scheme in FIG. 8 may be viewed as using a one-bit redundancy version bit (RVB) and a one-bit direction indication (DIR). RV=0 as shown in FIG. 8 may be represented by setting the one-bit RVB to 0 and the DIR to 0, i.e., RV=0⇔(RVB=0, DIR=0). The mapping between the RV and the RVB and the DIR is shown in Table Table 2 contemplates a mapping from RVB and DIR to redundancy version (RV). To reduce the control channel overhead, the new data indicator in the control channel (grant message) may be reused to indicate the direction of pointer movement in the transmitter and receiver buffer. Or in a more general form, the pointer movement direction, DIR, is a function of the new data indicator (NDI).

TABLE 2

Mapping from RVB and DIR to RV

| RV | RVB | DIR |
|---|---|---|
| 0 | 0 | 0 (clockwise) |
| 1 | 0 | 1 (counter-clockwise) |
| 2 | 1 | 0 (clockwise) |
| 3 | 1 | 1 (counter-clockwise) |

Table 2 may be represented as equations (17)-(20):

$$RV=0 \Leftrightarrow (RVB=0, DIR=0(\text{clockwise})); \quad (17)$$

$$RV=1 \Leftrightarrow (RVB=1, DIR=0(\text{counter-clockwise})); \quad (18)$$

$$RV=2 \Leftrightarrow (RVB=1, DIR=0(\text{clockwise})); \text{ and} \quad (19)$$

$$RV=3 \Leftrightarrow (RVB=1, DIR=1(\text{counter-clockwise})). \quad (20)$$

Figure 9:
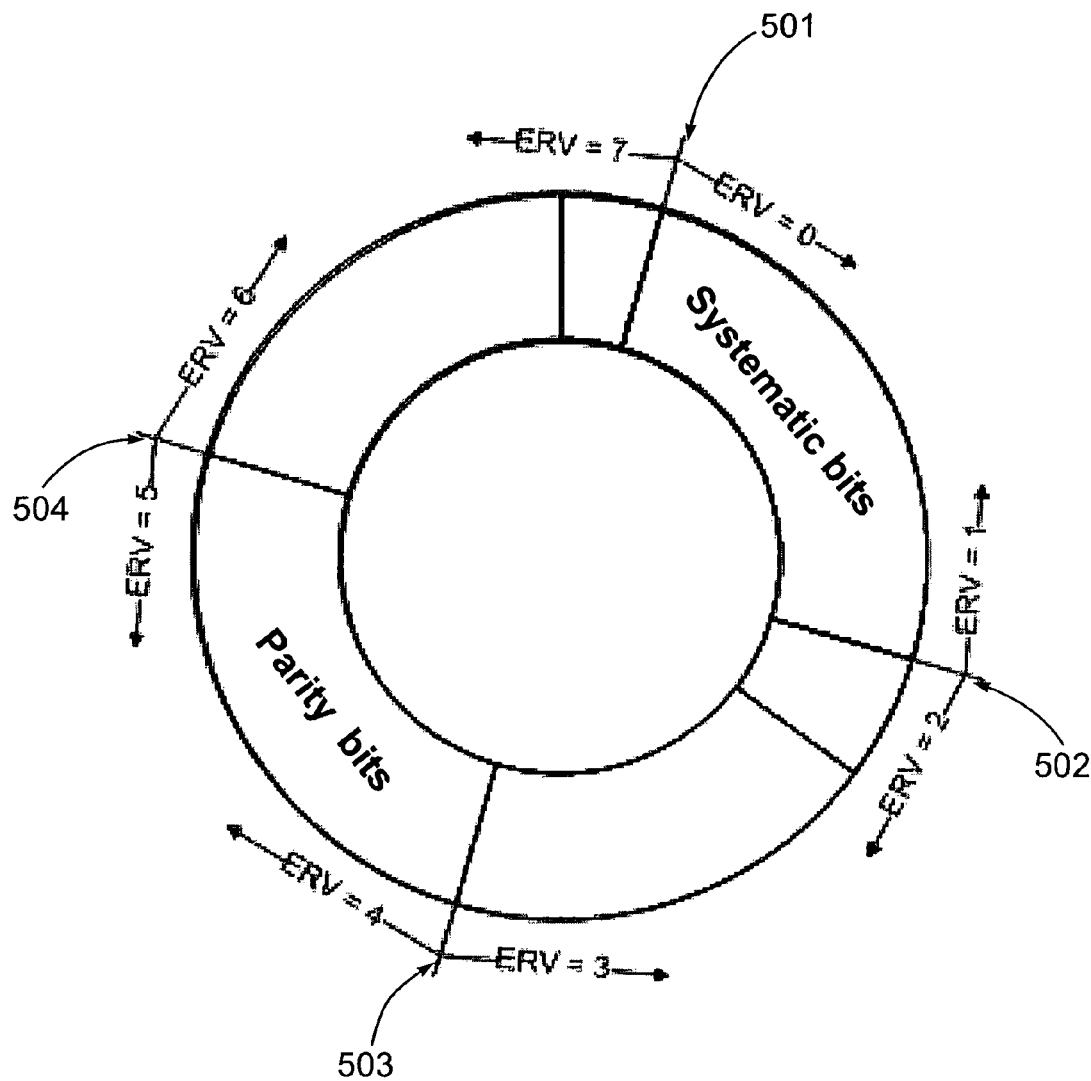
FIG. 9 shows an example of defining an extended redundancy version (ERV) by combing redundancy version (RV) and direction indication (DIR) constructed according to the principles of the present invention.

Alternative methods may be applied to the idea of adding the pointer movement direction into redundancy version (RV) definition and the concept of deriving the pointer movement direction from new data indicator. One example is shown in FIG. 9. In this case, a two-bit RV value is combined to a one-bit DIR value, and thus a total of 8 (0-7, i.e., 000-111 represented in three-bit value) extended redundancy versions (ERVs) may be defined. Again, the DIR may be either equal to the NDI or be a function of the NDI. The mapping from RV and DIR to ERV as shown in Table 3 is by no means the only solution. Table 3 shows a mapping from RV and DIR to ERV. In fact, the mapping from the 8 combinations of 2-bit RV and 1-bit DIR to the 8-value of ERVs may be arbitrary. Preferably, a one-to-one mapping is defined between (RV, DIR) and ERV. Note that a total of 8!=40320 one-to-one mapping is possible. One example of the mapping from RV and DIR to ERV is illustrated in Table 3, which corresponds to FIG. 9.

TABLE 3

Mapping from RV and DIR to ERV

| ERV | RV | DIR |
|---|---|---|
| 0 | 0 | 1 (clockwise) |
| 1 | 1 | 0 (counter-clockwise) |
| 2 | 1 | 1 (clockwise) |
| 3 | 2 | 0 (counter-clockwise) |
| 4 | 2 | 1 (clockwise) |
| 5 | 3 | 0 (counter-clockwise) |
| 6 | 3 | 1 (clockwise) |
| 7 | 0 | 0 (counter-clockwise) |

Table 3 may be represented as equations (21)-(28):

$$ERV=0 \Leftrightarrow (RV=0, DIR=1(\text{clockwise})); \quad (21)$$

$$ERV=1 \Leftrightarrow (RV=1, DIR=0(\text{counter-clockwise})); \quad (22)$$

$$ERV=2 \Leftrightarrow (RV=1, DIR=1(\text{clockwise})); \text{ and} \quad (23)$$

$$ERV=3 \Leftrightarrow (RV=2, DIR=0(\text{counter-clockwise})). \quad (24)$$

$$ERV=4 \Leftrightarrow (RV=2, DIR=1(\text{clockwise})); \quad (25)$$

$$ERV=5 \Leftrightarrow (RV=3, DIR=0(\text{counter-clockwise})); \quad (26)$$

$$ERV=6 \Leftrightarrow (RV=3, DIR=1(\text{clockwise})); \text{ and} \quad (27)$$

$$ERV=7 \Leftrightarrow (RV=0, DIR=0(\text{counter-clockwise})). \quad (28)$$

In FIG. 9, ERV=0 and RV=7 are defined to have same starting position 501, ERV=1 and ERV=2 are defined to have same starting position 502, ERV=3 and ERV=4 are defined to have same starting position 503, and ERV=5 and RV=6 are defined to have same starting position 504.

In the example as shown in FIG. 9, ERVs with values of even number (i.e., 0, 2, 4 and 6) will move the pointer in a clockwise direction in the buffer, and ERVs with values of odd number (i.e., 1, 3, 5 and 7) will move the pointer in a counter-clockwise direction in the buffer.

Alternative methods may be applied to the idea of combining RV and NDI to obtain extra flexibility in bit selection for rate matching.

Figure 10:
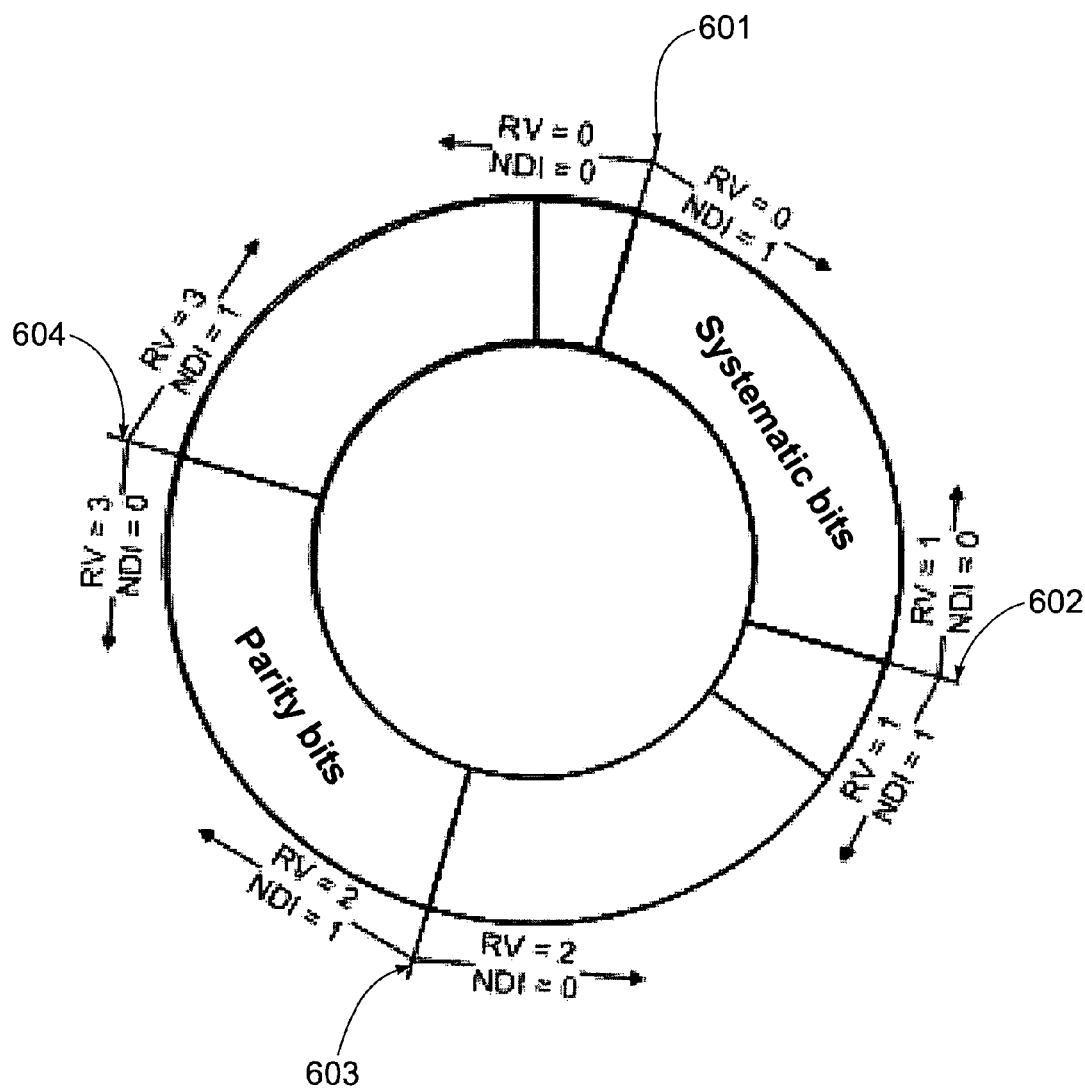
FIG. 10 shows an example of combining redundancy version (RV) and new data indication (NDI) to obtain extra flexibility in bit selection for rate matching constructed according to the principles of the present invention.

In one example as shown in FIG. 10, NDI=1 indicates that the pointer moves clockwise in the circular buffer and NDI=0 indicates otherwise. Same RV may move the pointer in either clockwise direction or counter clockwise direction. For example, RV=0 may move the pointer in both of clockwise direction and counter clockwise direction. Similar situation is applied to RV=1, RV=2 and RV=3. Four starting positions 601, 602, 603 and 604 are defined by four RVs, i.e., RV=0, RV=1, RV=2 and RV=3, respectively. Therefore, totally eight possibilities are allowed for the rate matching process to read (or write) bits (or soft values) in the circular buffer or at the encoder output (or decoder input).

Figure 11:
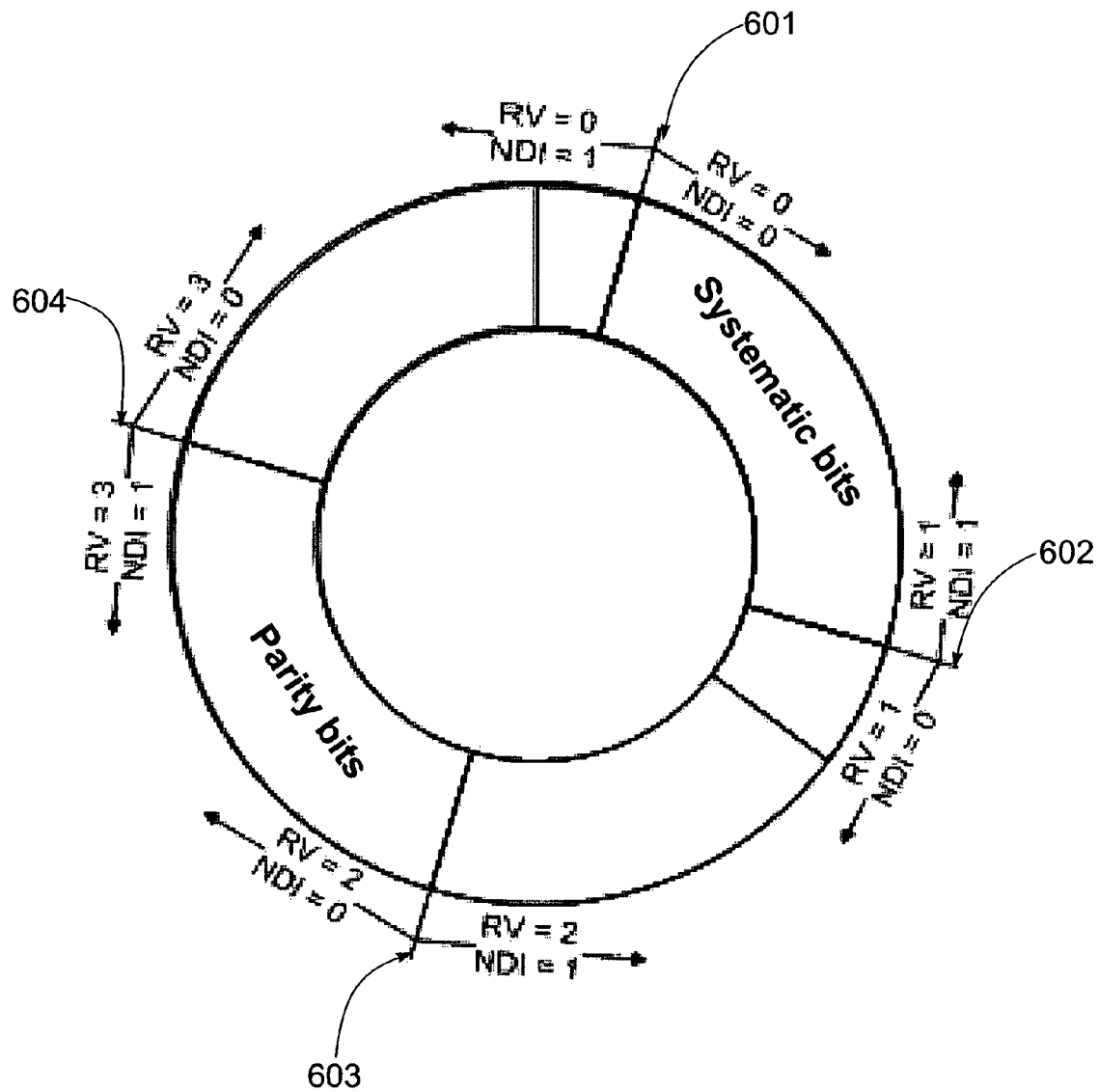
FIG. 11 shows another example of combining redundancy version (RV) and new data indication (NDI) to obtain extra flexibility in bit selection for rate matching constructed according to the principles of the present invention.

In another example shown in FIG. 11, similar description as stated for FIG. 10 will be omitted and only the difference will be shown. Different from example as shown in FIG. 10, NDI=0 in FIG. 11 indicates that the pointer moves clockwise in the circular buffer and NDI=1 indicates otherwise. Again, four starting positions are defined by four RVs respectively.

Figure 12:
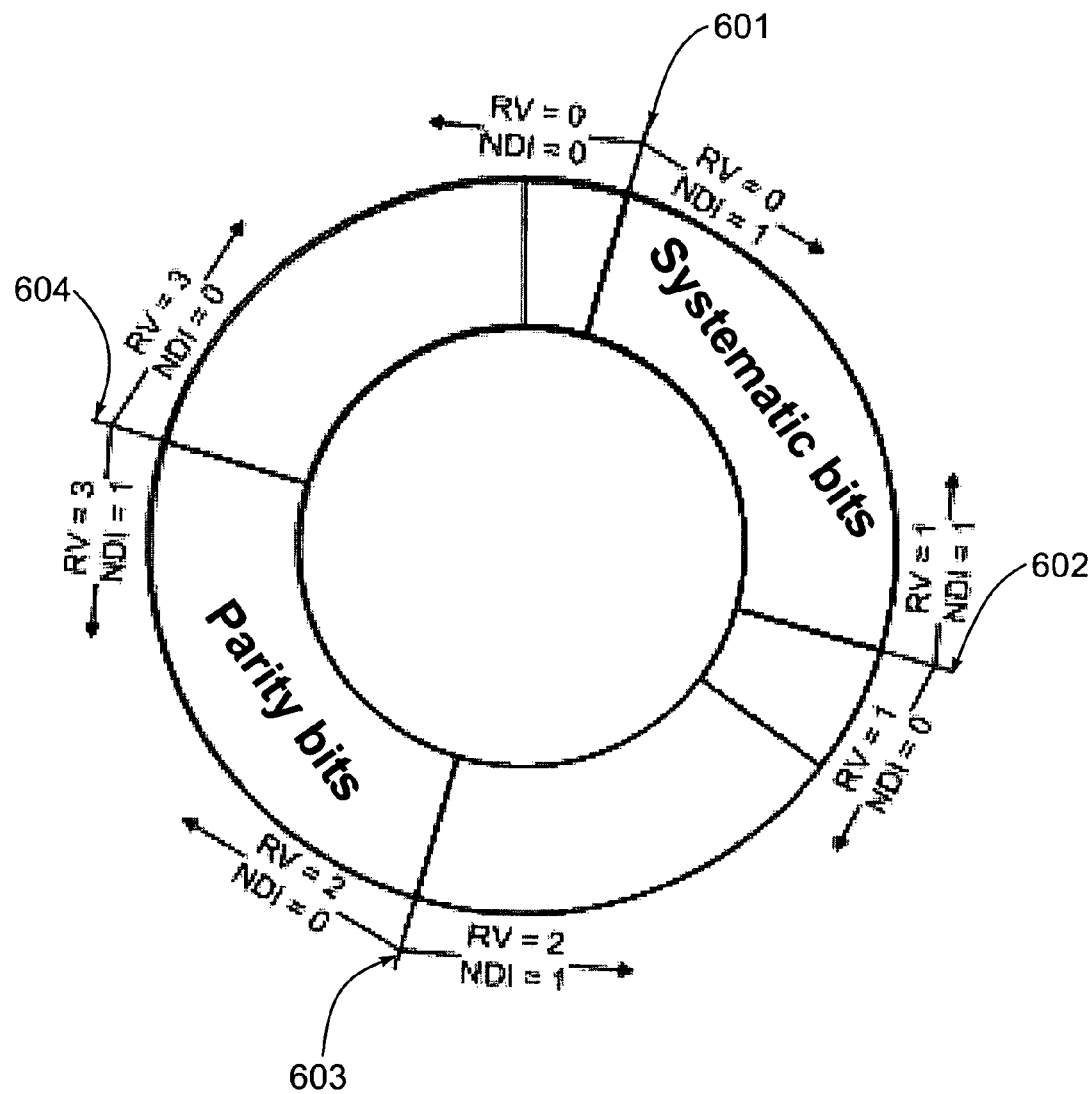
FIG. 12 shows still another example of combining redundancy version (RV) and new data indication (NDI) to obtain extra flexibility in bit selection for rate matching constructed according to the principles of the present invention.

In another example shown in FIG. 12, similar description as stated for FIG. 11 will be omitted and only the difference will be shown. Different from example as shown in FIG. 11, there is no direct relationship between NDI and the direction of pointer movement in this example. Four starting positions are defined by four RVs. A mapping from RV and NDI to rate matching is shown in Table 4.

TABLE 4

Mapping from RV and NDI to rate matching configuration

| RV | NDI | Rate matching configuration |
|---|---|---|
| 0 | 0 | Starting at RV = 0, move counter-clockwise |
| 0 | 1 | Starting at RV = 0, move clockwise |
| 1 | 0 | Starting at RV = 1, move clockwise |
| 1 | 1 | Starting at RV = 1, move counter-clockwise |
| 2 | 0 | Starting at RV = 2, move clockwise |
| 2 | 1 | Starting at RV = 2, move counter-clockwise |
| 3 | 0 | Starting at RV = 3, move clockwise |
| 3 | 1 | Starting at RV = 3, move counter-clockwise |

As shown in FIG. 12 and table 4, NDI in this example may refer to either a movement in a counter-clockwise direction or a movement in a clockwise direction.

Figure 13:
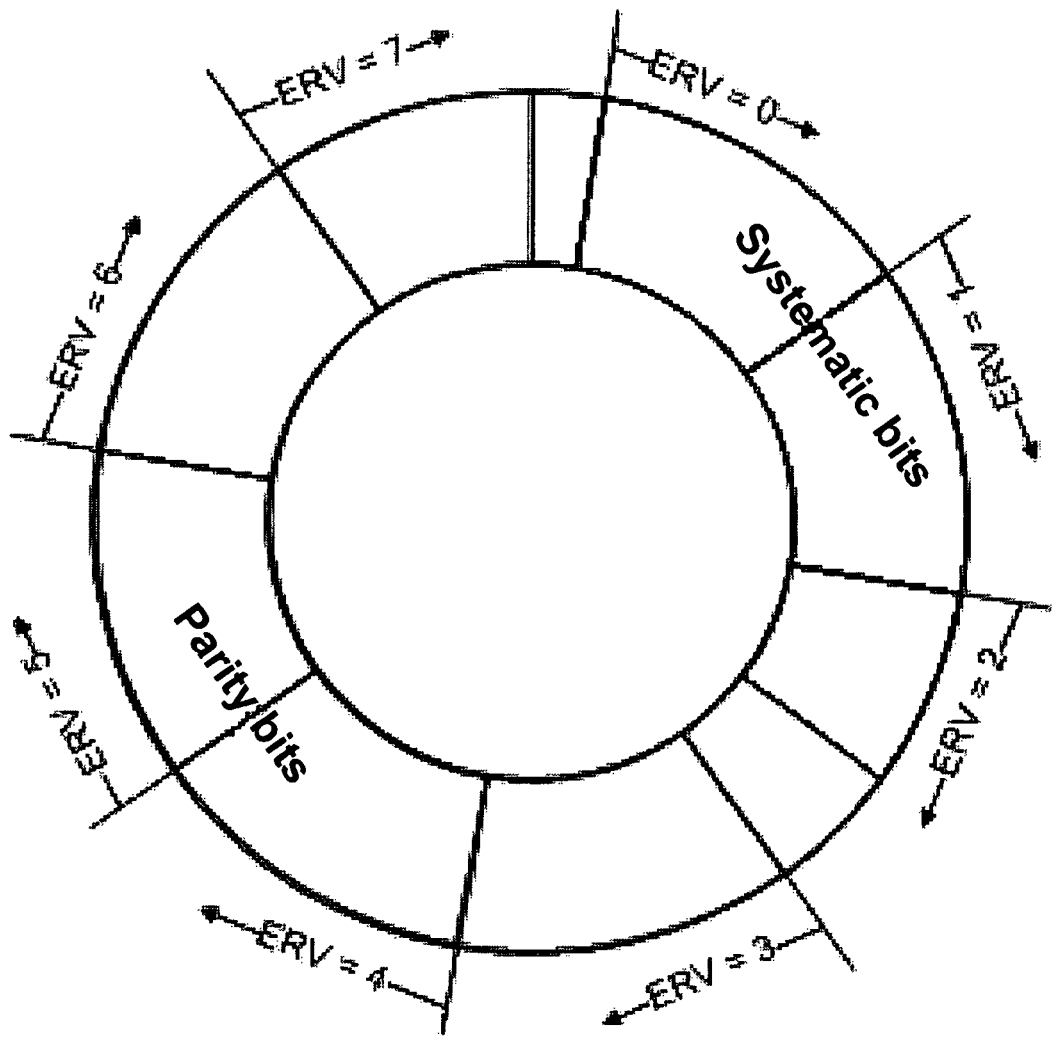
FIG. 13 shows an example of defining the extended redundancy version (ERV) with the redundancy version (RV) and the new data indicator (NDI) constructed according to the principles of the present invention.

The idea of using new data indicator (NDI) to extend the number of redundancy versions may be further generalized. In one embodiment of the present invention, an extended redundancy version (ERV) may be jointly defined by the new data indicator and the redundancy version. As previously shown in Table 3, one-bit of NDI field and two-bit of RV field are jointed as one indication, and thus a total of eight extended RV (ERV) may be defined as a combination of NDI field and RV field. FIG. 13 shows another example of defining extended ERV with the new data indicator (NDI). Different from the example as shown in FIG. 9, each of these eight RVs (i.e., ERV=0, ERV=1, ERV=2, ERV=3, ERV=4, ERV=5, ERV=6 and ERV=7) in this example may have different starting positions. In other words, it is not necessary to use the NDI to indicate the direction of pointer movement in order for the ideas in this invention to apply. Again, the mapping from (RV, NDI) to ERV may be arbitrary. Preferably, a one-to-one mapping is defined. For example, the ERV may be mapped to as ERV=2×RV+NDI. One example of using the extended RVs is as shown in following procedure:

```
erv_idx = 2×rv_idx + NDI
Set k_0 = R×(12×erv_idx + 2)
Set i = 0 and j = 0
while { i < K_rm }
    if z_(k_0+j)%K_z ≠ < NULL >
        z_i' = z_(k_0+j)%K_z
        i = i +1
        j = j +1
    else
        j = j +1
    end if
end while
``` where $erv_{idx}$ is index of ERV, $rv_{idx}$ is index of RV, $k_0$ is the starting position of an ERV, i is the index of the selected bits, and j is the index of original bits. In this example, the coded bits or soft values are read or written into the buffer, starting from a position defined by the extended redundancy version (ERV).

Figure 14:
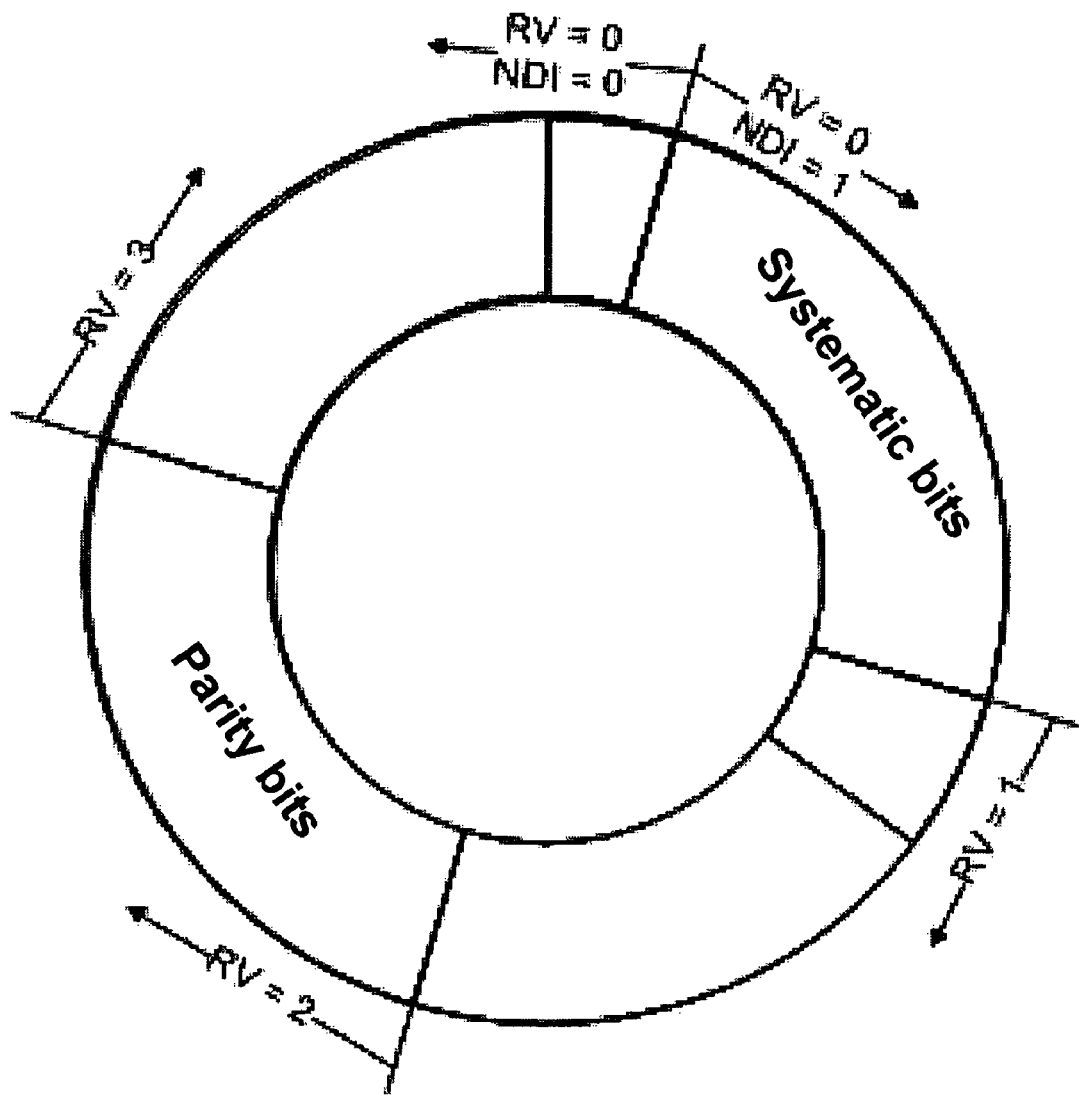
FIG. 14 shows an example in which the rate matching process is in dependence upon the value of the new data indication (NDI) for at least a first redundancy version, while the rate matching process is not in dependence upon the value of the new data indicator for at least a second redundancy version constructed according to the principles of the present invention.

In another embodiment of the present invention, the rate matching process that at transmitter side selects bits from a transmitter buffer (or at receiver side, or at an input to the decoder of the receiver, that writes soft values to a receiver buffer) depending on the value of the new data indication (NDI) for at least a first redundancy version, while the rate matching process that at transmitter side selects bits from a transmitter buffer (or at receiver side, or at an input to the decoder of the receiver, that writes soft values to a receiver buffer) in a fashion regardless of the value of the new data indicator for at least a second redundancy version. One example of this embodiment is shown in FIG. 14. Using circular buffer rate matching as an example, for RV=0, with the same starting position, the pointer moves in the buffer in different directions depending on the value of NDI (i.e., 0 or 1). (Again, as illustrated in previous embodiments as shown in FIG. 13, an offset to the starting position defined by RV may also be applied to different values of NDI.) For other redundancy versions (i.e., RV=1, RV=2 and RV=3), however, the method that the pointer moves in the buffer in different directions depending on the value of NDI is not defined. In other words, for RV=1, 2, or 3, the rate matching process always read or write bits or soft values in the same fashion regardless of the value of NDI. This design is maximally compatible with the contemporary design in which NDI is not taken into account in RV definition or rate matching. By combining NDI with one RV, this RV with NDI='1' may be used for a first transmission, while that RV with NDI='0' may be used for one of retransmissions following the first transmission. Preferably, the RV with NDI='0' is used for the second transmission such that the effective coding rate after the second transmission is maximized.

For example, one way of implementing this idea may be shown as follows. For a transmission, the circular buffer of length $K_z=3K''$ for the r-th coded block is defined as follows:

| | |
|---|---|
| $z_i = s'_i$ | for i = 0, . . . , K'' − 1 |
| $z_{K''+2i} = p1'_i$ | for i = 0, . . . , K'' − 1 |
| $z_{K''+2i+1} = p2'_i$ | for i = 0, . . . , K'' − 1 |

Denoting by $K_{rm}$ the rate matching output sequence length for this coded block, and $rv_{idx}$ the redundancy version number for this transmission, the rate matching output bit sequence is $z'_i$, i=0, 1, . . . , $K_{rm}$−1. The output bit sequence can be selected according to the following procedure:

```
if (NDI = 0 and RV = 0)
    γ = −1
else
    γ = +1
end if
Set k_0 = R×(24×rv_idx + 2)
Set i = 0 and j = 0
while { i < K_rm }
    if z_(k_0+j)%K_z ≠ < NULL >
        z_i' = z_(k_0+j)%K_z
        i = i +1
        j = j +γ
    else
        j = j +γ
    end if
end while
```

Here, R is the minimum integer R such that K'≦R×C=K" when C=32 is the number of columns in the sub-block interleaver. In other words, R=⌈K'/32⌉ is the number of rows of the sub-block interleaver used in the circular buffer rate matching. Again, an offset may be applied to the starting position for (RV=0, NDI=0) so that the starting bit position for (RV=0, NDI=0) does not overlap with the starting bit position of (RV=0, NDI=1).

Figure 15:
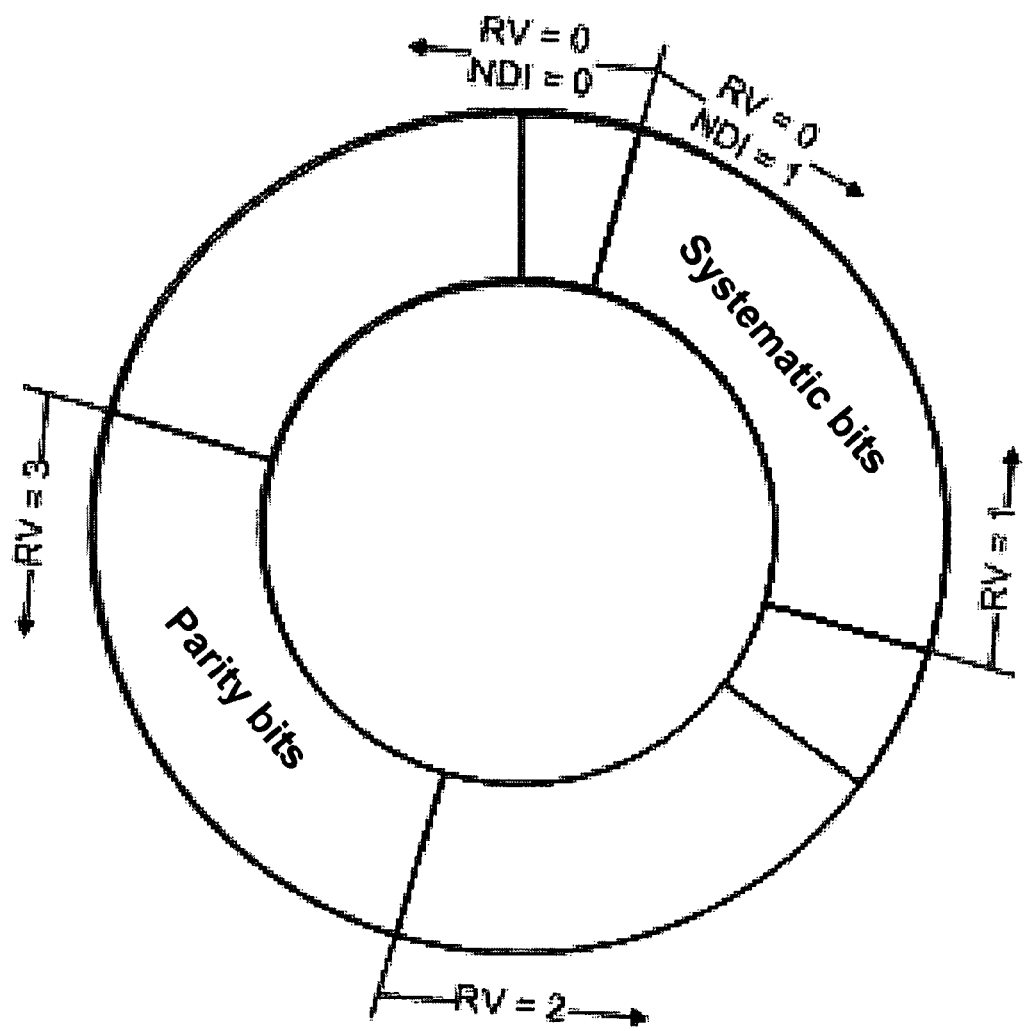
FIG. 15 shows another example in which the rate matching process is in dependence upon the value of the new data indication (NDI) for at least a first redundancy version, while the rate matching process is not in dependence on the value of the new data indicator for at least a second redundancy version constructed according to the principles of the present invention.

FIG. 15 shows another example of using the NDI to enable the rate matching process to select different set of coded bits (more redundancy versions) depending on the value of NDI. In this example, the pointer moves counter-clockwise (γ=−1) in the circular buffer for RV=1, 2, and 3. The pointer also moves counter-clockwise for (RV=0, NDI=0). The pointer moves clockwise (γ=+1) for (RV=0, NDI=1). When NDI=1 indicates a new packet and RV=0 is used for the first transmission, this design allows the same rate matching as the contemporary circular buffer rate matching, while at the same time the meaning of NDI may be interpreted as the direction of pointer movement in the circular buffer. For the first transmission (RV=0), NDI=1 and the pointer moves clockwise; for retransmissions, NDI=0 and the pointer moves counter-clockwise regardless of the value of RV.

As another example of combining NDI with a subset of RVs, RVs other than RV=0 may be used to allow rate matching process to operate differently depending on the NDI value. The rate matching process may operate differently depending on the NDI value for more than one RV.

Figure 16:
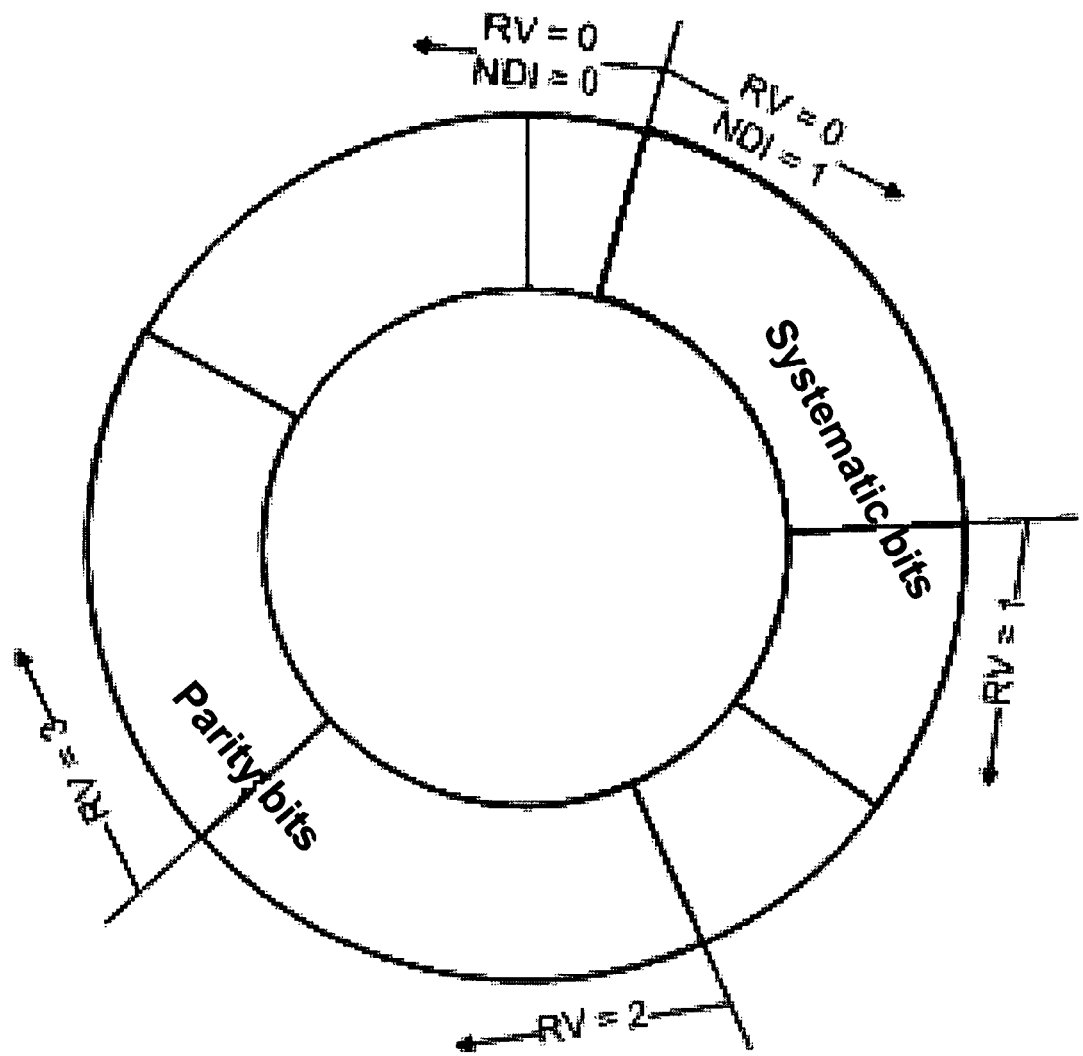
FIG. 16 shows an example of defining the starting positions of RVs based on the new data indicator (NDI) constructed according to the principles of the present invention.

One example of using new data indicator to define starting positions of rate matching is shown in FIG. 16. In this example, not only the direction of pointer movement is changed based on NDI, the starting position of RVs may also be changed at the same time. For example, one way of implementing this idea can be as follows. For a transmission, the circular buffer of length $K_z=3K''$ for the r-th coded block is defined as follows:

| | |
|---|---|
| $z_i = s'_i$ | for i = 0, . . . , K'' − 1 |
| $z_{K''+2i} = p1'_i$ | for i = 0, . . . , K'' − 1 |
| $z_{K''+2i+1} = p2'_i$ | for i = 0, . . . , K'' − 1 |

Denoting by $K_{rm}$ the rate matching output sequence length for this coded block, and $rv_{idx}$ the redundancy version number for this transmission, the rate matching output bit sequence is $z'_i$, $i=0, 1, \ldots, K_{rm}-1$. The output bit sequence can be selected according to the following procedure:

```
if (NDI = 0 and RV = 0)
    γ = -1
else
    γ = +1
end if
Set k₀ = R×(19×rv_idx + 2)
Set i = 0 and j = 0
while { i < K_rm }
    if z_(k₀+j)%Kz ≠ < NULL >
        z'_i = z_(k₀+j)%Kz
        i = i +1
        j = j +γ
    else
        j = j +γ
    end if
end while
```

Here, R is the minimum integer R such that $K' \leq R \times C = K''$ with $C=32$ is the number of columns in the sub-block interleaver. In other words, $R = \lceil K'/32 \rceil$ is the number of rows of the sub-block interleaver used in the circular buffer rate matching. In this example, by changing the starting position definition from $k0=R \times (24 \times rv_{idx}+2)$ to $k0=R \times (19 \times rv_{idx}+2)$, for RV=0, 1, 2, and 3. The resolution of rate matching is increased so that effective code rate across retransmissions may be improved. The "extra redundancy version" obtained by introducing (RV=0, NDI=0), however, allows the rate matching process the same or similar ability to pick up the coded bits between the starting positions of RV=0 and RV=3.

Figure 17:
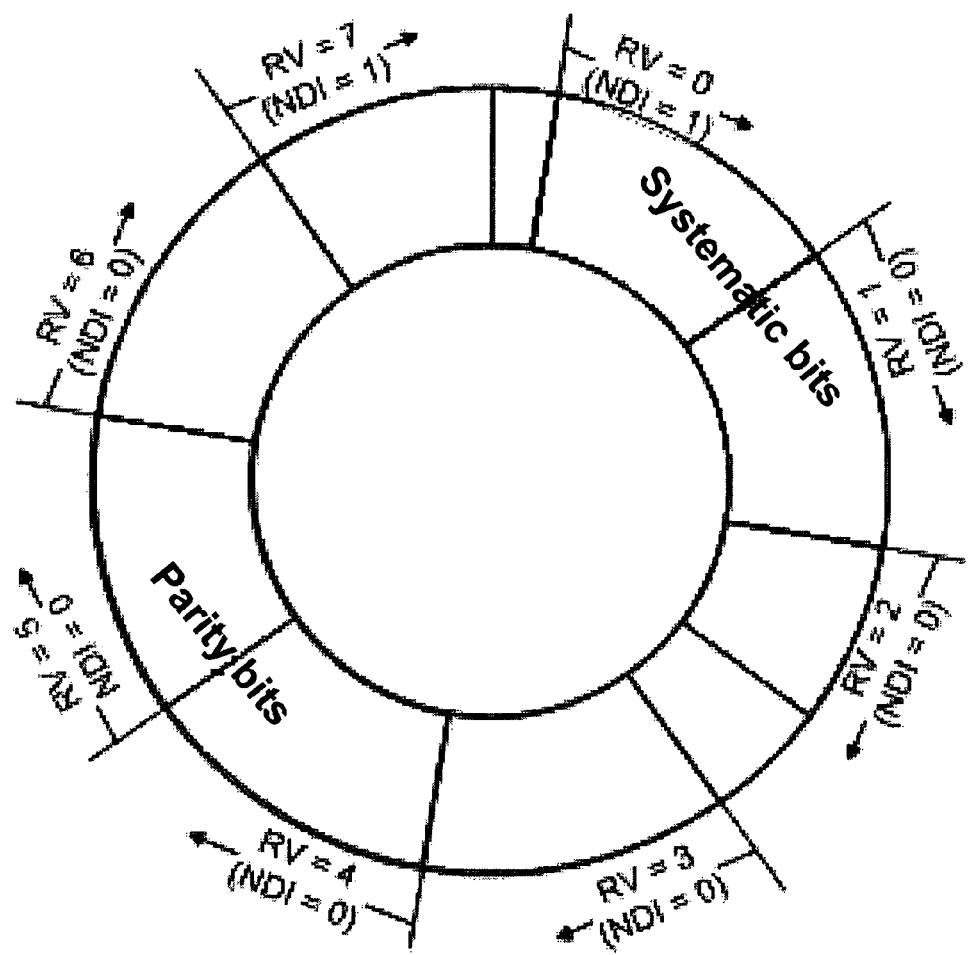
FIG. 17 shows an example in which the first transmission of a new packet is indicated by at least one value of the redundancy version (RV) constructed according to the principles of the present invention.

In one embodiment of the invention, the first transmission of a new packet is indicated by at least one value of the redundancy version. In other words, at least one value of redundancy version is used only when a new packet is sent. One example of this embodiment is shown in FIG. 17. In this example, RV=0 and RV=7 are reserved for new packet transmissions (i.e., NDI is set as 1), RV=1, 2, 3, 4, 5, 6 are used for retransmissions (i.e., NDI is set as 0). Upon receiving the redundancy version, the receiver knows whether the transmission is for a new packet according to the value of the redundancy version. In this example, the reason of having multiple RVs for new packet transmission is to provide the flexibility for the rate matching process to transmit the most suitable set of bits for the first transmission, depending on other conditions such as, among others, resource assignment, channel condition, and effective coding rate.

Figure 18:
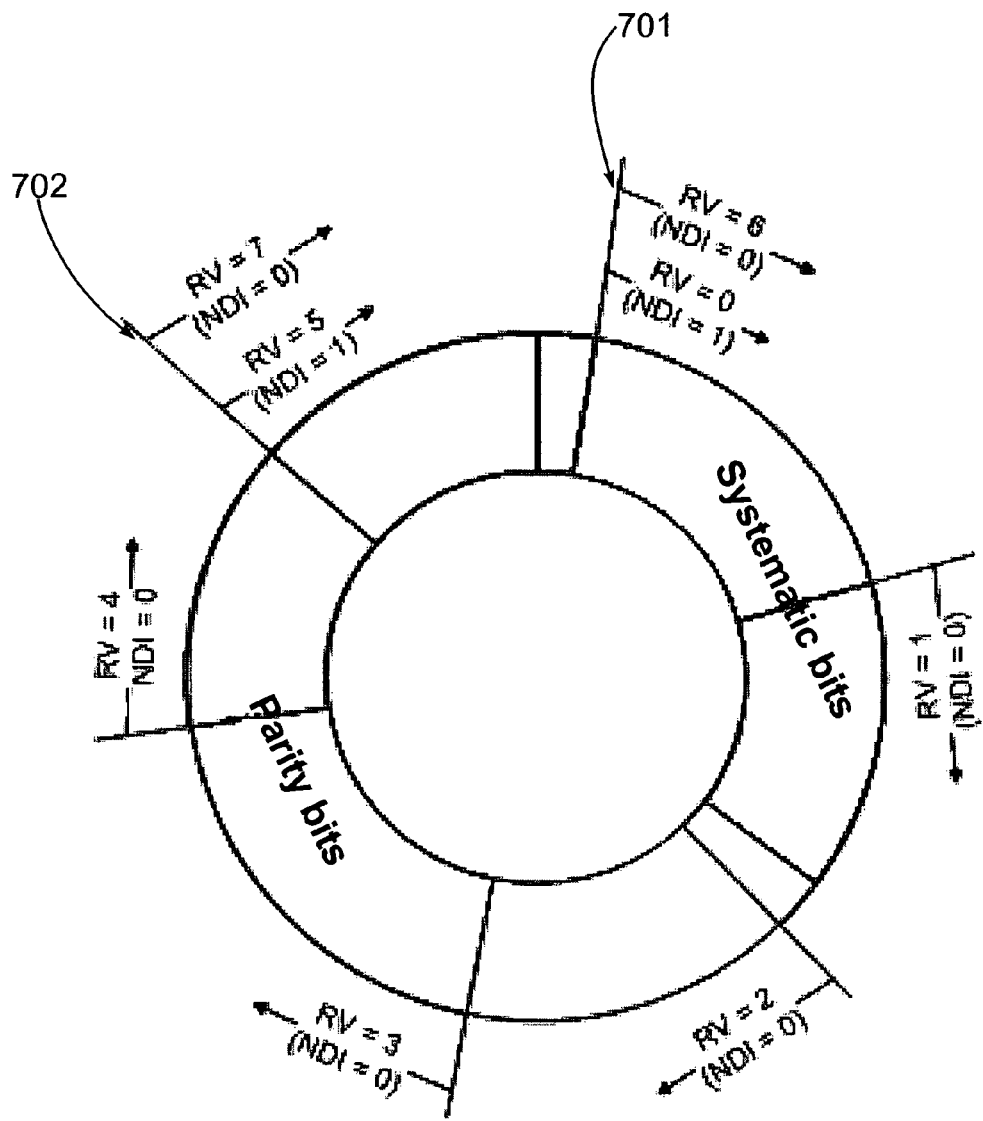
FIG. 18 shows an example in which a plurality of RVs may be defined for at least one same starting position, and at least one of the plurality of RVs may be reserved for new packet transmission constructed according to the principles of the present invention.

Alternatively, a plurality of RVs may be defined for at least one starting position for bit selection in the rate matching process, with at least one of the plurality of RVs only used for new packet transmission. One example is shown in FIG. 18, RV=0 and RV=6 are defined at a same starting position 701. RV=0 may be used when a new packet is transmitted, while RV=6 may be used for a retransmission using the same starting position 701 as RV=0. Similarly, RV=5 and RV=7 are defined at a same starting position 702. RV=5 may be used when a new packet is transmitted, while RV=7 may be used for a retransmission using same starting position 702 as RV=5.

For example, one way of implementing this idea may be shown as follows. For a transmission, the circular buffer of length $K_z=3K''$ for the r-th coded block is defined as follows:

$$z_i = s'_i \quad \text{for } i = 0, \ldots, K'' - 1$$
$$z_{K''+2i} = p1'_i \quad \text{for } i = 0, \ldots, K'' - 1$$
$$z_{K''+2i+1} = p2'_i \quad \text{for } i = 0, \ldots, K'' - 1$$

Denoting by $K_{rm}$ the rate matching output sequence length for this coded block, and $rv_{idx}$ the redundancy version number for this transmission, the rate matching output bit sequence is $z'_i$, $i=0, 1, \ldots, K_{rm}-1$. The output bit sequence may be selected according to the following procedure:

```
if (rv_idx < 6)
    k₀ = R×(16×rv_idx + 2)
else if (rv_idx = 6)
    k₀ = R×(16×0 + 2)
else
    k₀ = R×(16×5 + 2)
end if
Set i = 0 and j = 0
while { i < K_rm }
    if z_(k₀+j)%Kz ≠ < NULL >
        z'_i = z_(k₀+j)%Kz
        i = i +1
        j = j +1
    else
        j = j +1
    end if
end while
```

Note that R is the minimum integer R such that $K' \leq R \times C = K''$ with $C=32$ is the number of columns in the sub-block interleaver. In other words, $R = \lceil K'/32 \rceil$ is the number of rows of the sub-block interleaver used in the circular buffer rate matching. In this example, by changing the starting position definition from $k_0=R \times (24 \times rv_{idx}+2)$ to $k_0=R \times (16 \times rv_{idx}+2)$, for RV=0, 1, 2, \ldots, 5. RV=6 uses the same starting position as RV=0 and RV=7 uses the same starting position as RV=5. By doing so, the first transmission of a new packet has the flexibility of choosing between RV=0 and RV=5, while the resolution of rate matching is increased so that effective code rate across retransmissions may be improved.

There are many ways to apply the embodiments disclosed in this invention. Although one or two bits of redundancy version are used as examples in the aforementioned embodiments, it is certainly that the ideas disclosed in this invention may be applied to scenarios with redundancy versions having other than one or two bits. And the number of redundancy versions is not necessary to be as power of 2. For simplicity and clarity, the description in this invention mostly describes the operations at the transmitter side. It may be recognized by one of ordinary skill in the art that the embodiments of the inventions have applicability to the receiver side as well. For example, when a transmitter chooses a starting position in bit selection for a transmission, the receiver needs to choose a starting position in reception of this transmission in order to put the received signals to the right position either in a receiver buffer or at an input of the decoder.

Although the description of the embodiments is based on the concept of circular buffer, the actual implementation of either transmitter or receiver may not implement the circular buffer as a single and separate step. Instead, the circular buffer rate matching operation may be achieved together with other processes such as rate matching due to buffer size limitation, sub-block interleaving, bit selection for a given redundancy version, filler bits padding/depadding, dummy bits insertion/pruning, modulation, channel interleaving, and mapping modulation symbols to physical resources, etc.

Figure 19:
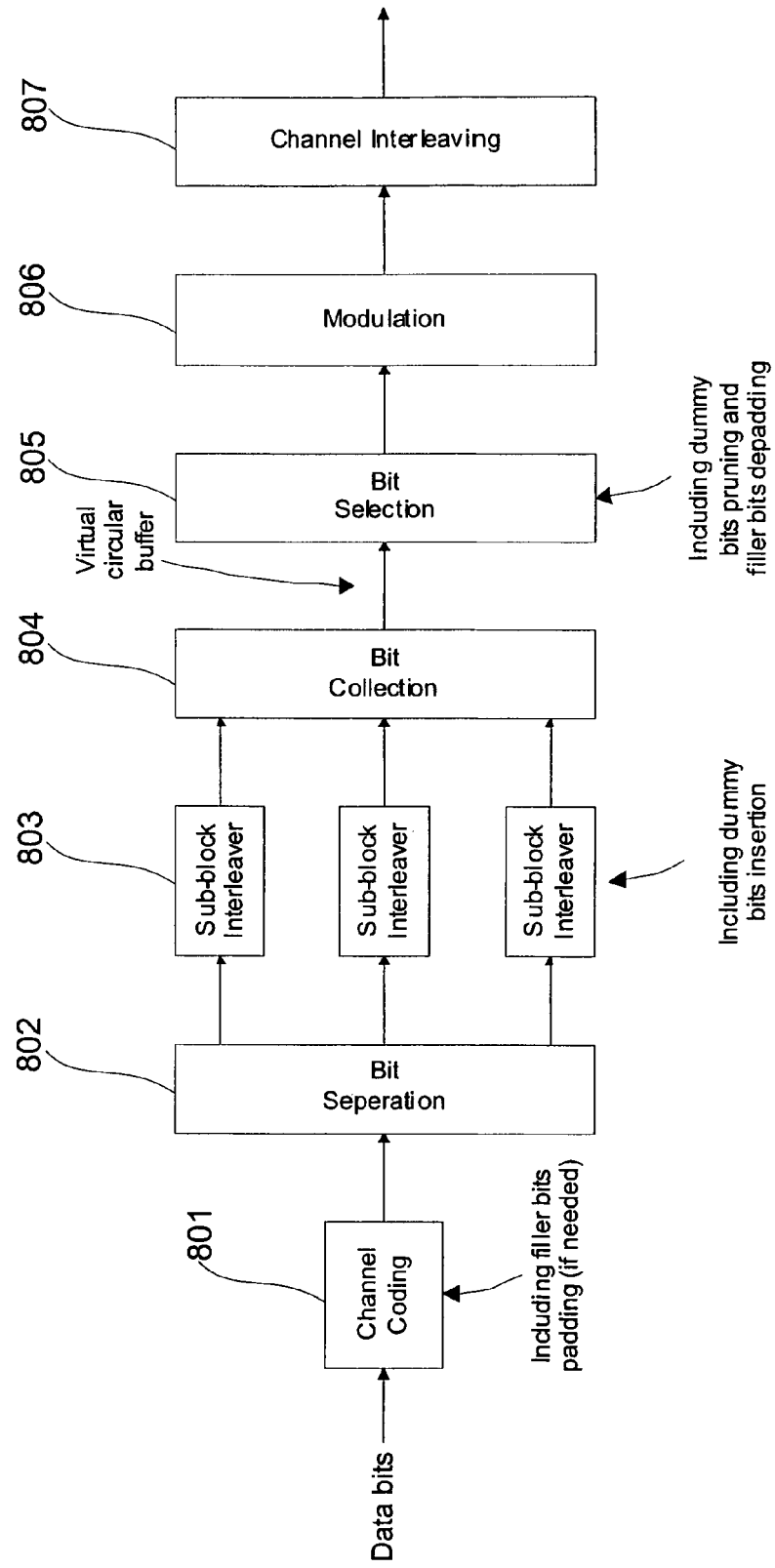
FIG. 19 is a diagram which illustrates a part of the transmitter chain for LTE downlink shared channel (DL_SCH) and uplink shared channel (UL_SCH) constructed according to the principles of the present invention.

FIG. 19 illustrates a part of the transmitter chain for LTE downlink shared channel (DL_SCH) and uplink shared channel (UL_SCH). As shown in FIG. 19, data bits are encoded at channel coding stage 801 which may includes a process of padding filler bits when needed. The encoded data bits are then separated at bit separation stage 802 into three data streams, i.e., one systematic bits stream and two parity bit streams as shown in FIG. 6. These three bits streams are then interleaved by the corresponding sub-block interleavers 803. Sub-block interleavers 803 may insert dummy bits when needed. Interleaved bits are further collected at bit collection stage 804. The circular buffer is implanted between the stages of bit collection and bit selection. By using the value of redundancy version and/or new data indication, coded bits are properly selected for each transmission. After bit selection stage 805, data bits are modulated by the modulation stage 806 and then interleaved at channel interleaving stage 807. At bit selection stage 805, dummy bits may be pruned and filler bits may be depadded. The embodiments described in the present invention may be applied to the 'Bit Selection' stage 805 in the process that uses the value of redundancy version and/or new data indication to select the coded bits for each transmission. It may be recognized by one of ordinary skill in the art that the embodiments of the inventions have applicability to the implementations if the 'Bit Selection' step is combined with other steps in the transmitter processing chain.

Figure 20:
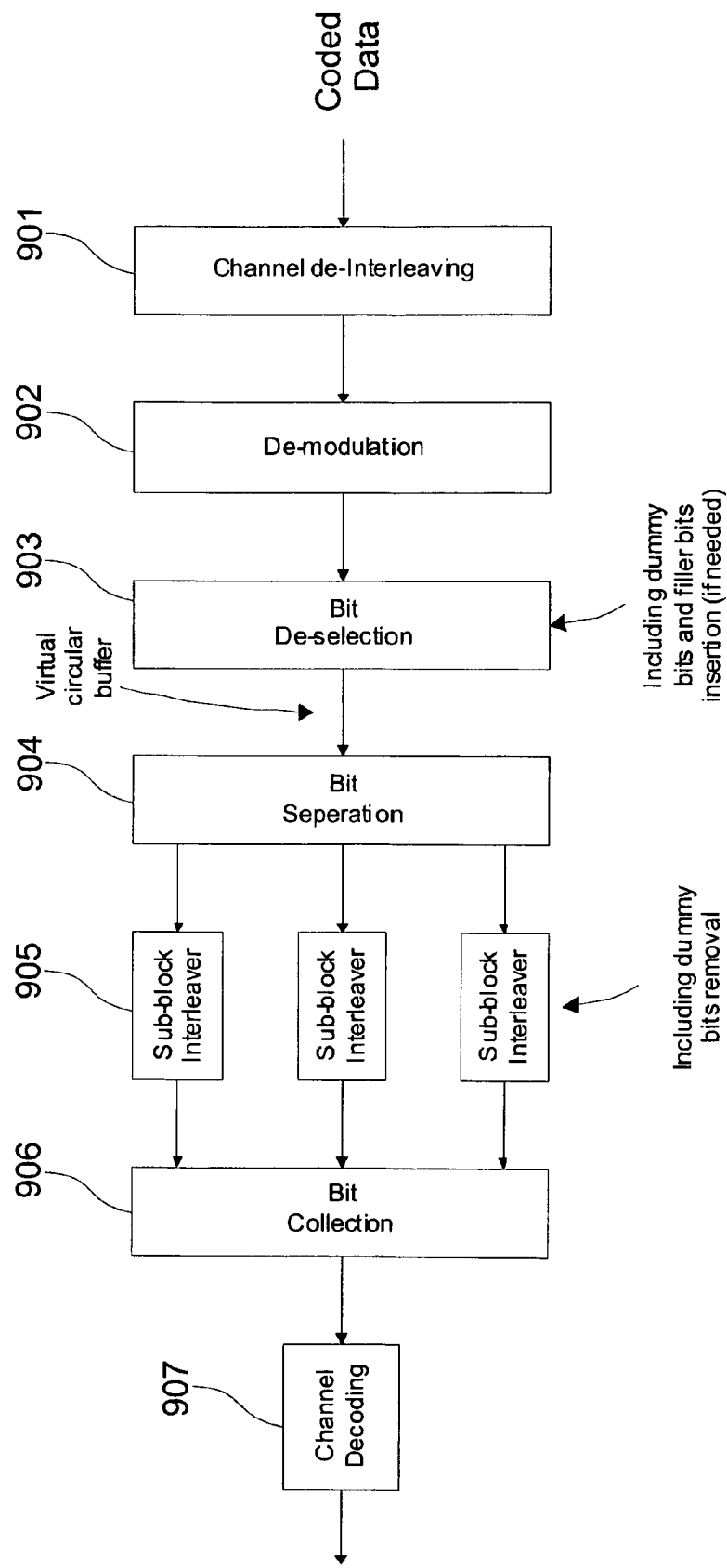
FIG. 20 is a diagram which illustrates a part of the receiver chain for downlink shared channel (DL_SCH) and uplink shared channel (UL_SCH) constructed according to the principles of the present invention.

FIG. 20 illustrates a part of the receiver chain for downlink shared channel (DL_SCH) and uplink shared channel (UL_SCH).

As shown in FIG. 20, coded data bits are de-interleaved at a channel deinterleaving stage 901 and then de-modulated at a de-modulation stage 902. A virtual circular buffer is implanted between the stages of bit de-selection and bit separation stage. By using the value of redundancy version and/or new data indication, the received soft values are properly put into correct positions in the receive buffer or input to the channel decoder for each transmission. After bit separation stage 904, coded bits are separated into three streams, i.e., one systematic bits stream and two parity bits streams. These three bits streams are then de-interleaved by the corresponding sub-block interleavers 905, and then further collected at bit collection stage 906. Sub-block interleavers 905 may remove dummy bits. Then, the collected bits are decoded at a channel decoding stage 907. The embodiments described in this invention may be applied to 'Bit De-selection' stage 903 in the process that uses the value of redundancy version and/or new data indication to put the received soft values to the correct positions in the buffer or input to the channel decoder for each transmission. Bit de-selection stage 903 may insert dummy bits and filler bits when needed. It may be recognized by one of ordinary skill in the art that the embodiments of the invention have applicability to the implementations if the 'Bit De-selection' step is combined with other steps in the transmitter processing chain.

For the sake of convenience, some of the description in this invention assumes that the circular buffer is not truncated. For example, we assume a turbo code with ⅓ mother code rate and no puncturing of the coded bits except the one caused by rate matching for transmission. In certain systems or implementations, however, in order to reduce the buffer size at the transmitter and the receiver, puncturing of some of the coded bits may occur even without rate matching for transmission. It may be recognized by one of ordinary skill in the art that the embodiments of the invention have applicability to those scenarios. In addition, although the description of the embodiments is based on the concept of circular buffer, many of the aforementioned embodiments, together with a general idea of combining new data indication with redundancy version indication, are applicable when other types of buffers are used.

As a straightforward extension, the aforementioned embodiments may be easily combined.

What is claimed is:

1. A method for transmitting data, the method comprising the steps of:
    separating a plurality of coded bits into a plurality of bit streams;
    interleaving the plurality of bit streams respectively;
    interlacing the interleaved bit streams;
    collecting the interleaved and interlaced bit streams;
    selecting, at a code block unit, a group of coded bits to be transmitted from the collected bit streams based on a starting position corresponding to a redundancy version (RV) and an output bit sequence length;
    filling a circular buffer associated with the code block unit with the group of coded bits to be transmitted; and
    transmitting the selected group of coded bits at one or more transmitting antennas,
    wherein the code block unit is one of a plurality of code block units in a transport block and wherein each code block unit is associated with its own circular buffer, such that the transport block is associated with a plurality of circular buffers.

2. The method of claim 1, further comprising:
    segmenting the coded bits into at least one code block; and
    encoding each of the at least one code block respectively.

3. The method of claim 1, wherein the plurality of bit streams comprise at least one systematic bit stream and at least two parity bit streams.

4. The method of claim 3, wherein collecting the interleaved bit streams comprises:
    writing interleaved the at least one systematic bit stream on a front position of a buffer; and
    writing interleaved the at least two parity bit streams alternatively next to the at least one interleaved systematic bit stream.

5. The method of claim 1, wherein selecting the group of coded bits to be transmitted is based on a modulation order additionally with the RV and the output bit sequence length.

6. A transmitter, comprising:
    an encoder configured to encode a plurality of input bits;
    a bit separator configured to separate a plurality of coded bits into a plurality of bit streams;
    an interleaver configured to interleave the plurality of bit streams respectively;
    an interlacer configured to interlace the interleaved bit streams;
    a bit collector configured to collect the interleaved and interlaced bit streams;
    a code block unit configured to:
        select a group of coded bits to be transmitted from the collected bit streams based on a starting position corresponding to a redundancy version (RV) and an output bit sequence length, and
        fill a circular buffer associated with the code block unit with the group of coded bits to be transmitted; and
    one or more transmitting antennas configured to transmit the selected group of coded bits,
    wherein the code block unit is one of a plurality of code block units in a transport block of the transmitter and wherein each code block unit is associated with its own circular buffer, such that the transport block is associated with a plurality of circular buffers.

7. The transmitter of claim 6, wherein the encoder segments the input bits into at least one code block and encodes each of the at least one code block respectively.

8. The transmitter of claim 6, wherein the plurality of bit streams comprise at least one systematic hit stream and at least two parity bit streams.

9. The transmitter of claim 8, wherein the bit collector writes interleaved the at least one systematic bit stream on a front position of a buffer and writes interleaved the at least two parity bit streams alternatively next to the at least one interleaved systematic bit stream.

10. The transmitter of claim 6, wherein the code block unit selects the group of coded bits based on a modulation order additionally with the RV and the output bit sequence length.

11. A method for receiving data, the method comprising the steps of:
    receiving a plurality of coded bits of a code block at a plurality of receiving antennas;
    selecting a plurality of groups of coded bits from the received plurality of coded bits based on a starting position corresponding to a redundancy version (RV) and an output bit sequence length;
    separating the selected groups of coded bits into a plurality of bit streams;
    de-interleaving the plurality of bit streams respectively;
    collecting the de-interleaved bit streams; and
    decoding the collected bit streams,
    wherein the plurality of bit streams were interlaced after being interleaved,
    wherein the code block is one of a plurality of code blocks in a transport block and wherein each code block unit is associated with its own circular buffer, such that the transport block is associated with a plurality of circular buffers.

12. The method of claim 11, wherein the plurality of bit streams comprise at least one systematic bit stream and at least two parity bit streams.

13. The method of claim 12, wherein collecting the interleaved bit streams comprises:
    writing interleaved the at least one systematic bit stream on a front position of a buffer; and
    writing interleaved the at least two parity bit streams alternatively next to the at least one interleaved systematic bit stream.

14. The method of claim 11, wherein selecting the groups of coded bits is based on a modulation order additionally with the RV and the output bit sequence length.

15. A receiver, comprising:
    a plurality of receiving antennas configured to receive a plurality of coded bits;
    a bit de-selector configured to select a group of coded bits from the received plurality of coded bits based on a starting position corresponding to a redundancy version (RV) and an output bit sequence length;
    a bit separator configured to separate the selected groups of coded bits into a plurality of bits streams;
    an interleaver configured to de-interleave the plurality of bit streams respectively;
    a bit collector configured to collect the de-interleaved bit streams; and
    a decoder configured to decode the collected bit streams,
    wherein the plurality of bit streams were interlaced after being interleaved,
    wherein the code block is one of a plurality of code blocks in a transport block and wherein each code block unit is associated with its own circular buffer, such that the transport block is associated with a plurality of circular buffers.

16. The receiver of claim 15, wherein the plurality of bit streams comprise at least one systematic bit stream and at least two parity bit streams.

17. The receiver of claim 16, wherein the bit collector writes interleaved the at least one systematic bit stream on a front position of a buffer and writes interleaved the at least two parity bit streams alternatively next to the at least one interleaved systematic bit stream.

18. The receiver of claim 15, wherein the bit de-selector selects the group of coded bits based on a modulation order additionally with the RV and the output bit sequence length.

* * * * *